United States Patent
Sammour et al.

(10) Patent No.: US 10,135,610 B2
(45) Date of Patent: Nov. 20, 2018

(54) METHOD AND APPARATUS FOR CIPHERING PACKET UNITS IN WIRELESS COMMUNICATIONS

(71) Applicant: InterDigital Technology Corporation, Wilmington, DE (US)

(72) Inventors: Mohammed Sammour, Amman (JO); Shankar Somasundaram, Sunnyvale, CA (US); Peter S. Wang, E. Setauket, NY (US); Rajat P. Mukherjee, Toronto (CA); Stephen E. Terry, Northport, NY (US); Jin Wang, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/302,070

(22) Filed: Jun. 11, 2014

(65) Prior Publication Data

US 2014/0294179 A1    Oct. 2, 2014

Related U.S. Application Data

(63) Continuation of application No. 12/048,120, filed on Mar. 13, 2008, now abandoned.
(Continued)

(51) Int. Cl.
*H04K 1/00* (2006.01)
*H04L 9/08* (2006.01)
(Continued)

(52) U.S. Cl.
CPC .......... *H04L 9/0819* (2013.01); *H04W 12/04* (2013.01); *H04W 80/02* (2013.01);
(Continued)

(58) Field of Classification Search
CPC ...... G06F 21/608; H04W 80/02; H04W 12/04
See application file for complete search history.

(56) References Cited

U.S. PATENT DOCUMENTS 6,870,932 B2    3/2005 Jiang
7,197,145 B2    3/2007 Yi
(Continued)

OTHER PUBLICATIONS

Alcatel-Lucent, "Network Impacts of Contexts Relocation", 3GPP TSG RAN WG3 #55, R3-070226, (St Louis, Feb. 12-16, 2007).
Ericsson, "RLC-MAC Header Formats", 3GPP TSG-RAN WG2 #56-bis, R2-070062, (Sorrento, Italy, Jan. 15-19, 2007).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300 V0.9.0 (Mar. 2007).
(Continued)

*Primary Examiner* — Morshed Mehedi
*Assistant Examiner* — Abdullah Almamun
(74) *Attorney, Agent, or Firm* — Volpe and Koenig, P.C.

(57) ABSTRACT

A method and apparatus are disclosed relating to ciphering and de-ciphering of packet units in wireless devices during retransmission in wireless communications. The packet units are re-segmented with the ciphering done on the re-segmented packet unit or on a radio link control protocol data unit (RLC PDU) with or without segmentation. Alternatively, the re-segmentation is done on the radio link control service data unit (RLC SDU) with or without segmentation. Alternatively, the ciphering process and multiplexing of the RLC PDU is done in the medium access control (MAC) layer of a MAC PU before undergoing a hybrid automatic repeat request (HARQ) process for retransmission. Further, the ciphering process in the RLC is done on a packet data convergence protocol packet data unit (PDCP PDU).

10 Claims, 19 Drawing Sheets

Related U.S. Application Data

(60) Provisional application No. 60/895,134, filed on Mar. 15, 2007.

(51) Int. Cl.
  *H04W 80/02* (2009.01)
  *H04W 12/04* (2009.01)
  *H04W 12/02* (2009.01)
  *H04W 28/06* (2009.01)

(52) U.S. Cl.
  CPC ......... *H04L 2209/24* (2013.01); *H04W 12/02* (2013.01); *H04W 28/06* (2013.01)

(56) References Cited

U.S. PATENT DOCUMENTS

| | | | |
|---|---|---|---|
| 7,366,496 B2* | 4/2008 | Vialen | H04L 12/2602 455/410 |
| 7,551,596 B2 | 6/2009 | Kim et al. | |
| 7,633,899 B2 | 12/2009 | Choi et al. | |
| 7,733,914 B2 | 6/2010 | Baker et al. | |
| 7,813,361 B2 | 10/2010 | Lee et al. | |
| 7,839,894 B2 | 11/2010 | Yi | |
| 7,860,125 B2 | 12/2010 | Bains | |
| 7,869,461 B2 | 1/2011 | Lohr et al. | |
| 7,924,710 B2 | 4/2011 | Rollet | |
| 8,111,668 B2 | 2/2012 | Balachandran et al. | |
| 8,155,053 B2* | 4/2012 | Wang | H04L 1/1867 370/328 |
| 8,208,498 B2* | 6/2012 | Kitazoe | H04W 12/04 370/235 |
| 2002/0126629 A1 | 9/2002 | Jiang et al. | |
| 2003/0039229 A1 | 2/2003 | Ostman | |
| 2003/0157927 A1* | 8/2003 | Yi et al. | 455/411 |
| 2003/0206534 A1* | 11/2003 | Wu | 370/328 |
| 2003/0235212 A1* | 12/2003 | Kuo | H04W 76/046 370/503 |
| 2003/0236085 A1* | 12/2003 | Ho | H04W 12/02 455/411 |
| 2004/0203971 A1* | 10/2004 | Kuo | 455/517 |
| 2005/0021945 A1 | 1/2005 | Niemi et al. | |
| 2005/0245276 A1* | 11/2005 | Torsner | H04L 1/1835 455/502 |
| 2006/0040645 A1* | 2/2006 | Grilli | H04W 28/18 455/412.1 |
| 2006/0251105 A1 | 11/2006 | Kim et al. | |
| 2007/0041382 A1* | 2/2007 | Vayanos et al. | 370/394 |
| 2007/0070913 A1* | 3/2007 | Kallio | H04W 28/06 370/252 |
| 2007/0171857 A1 | 7/2007 | Wang et al. | |
| 2008/0002594 A1* | 1/2008 | Forsberg | H04L 9/12 370/252 |
| 2008/0101312 A1 | 5/2008 | Suzuki et al. | |
| 2008/0137652 A1 | 6/2008 | Herrmann et al. | |
| 2009/0104890 A1* | 4/2009 | Wang | H04W 12/02 455/410 |
| 2010/0165901 A1* | 7/2010 | Kim | 370/312 |
| 2010/0172445 A1 | 7/2010 | Herrmann | |
| 2012/0099525 A1* | 4/2012 | Maheshwari | H04L 63/068 370/328 |

OTHER PUBLICATIONS

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300 V8.3.0 (Dec. 2007).

Third Generation Partnership Project, "Technical Specification Group Radio Access Network; Packet Data Convergence Protocol (PDCP) Specification (Release 6)", 3GPP TS 25.323 V6.8.0 (Dec. 2006).

Third Generation Partnership Project, "Technical Specification Group Radio Access Network; Packet Data Convergence Protocol (PDCP) Specification (Release 6)", 3GPP TS 25.323 V6.11.0 (Dec. 2007).

Third Generation Partnership Project, "Technical Specification Group Radio Access Network; Packet Data Convergence Protocol (PDCP) Specification (Release 7)", 3GPP TS 25.323 V7.3.0 (Dec. 2006).

Third Generation Partnership Project, "Technical Specification Group Radio Access Network; Packet Data Convergence Protocol (PDCP) Specification (Release 7)", 3GPP TS 25.323 V7.7.0 (Dec. 2007).

Third Generation Partnership Project, "Technical Specification Group Radio Access Network; Packet Data Convergence Protocol (PDCP) Specification (Release 7)", 3GPP TS 25.323 V8.0.0 (Dec. 2007).

Third Generation Partnership Project, "Technical Specification Group Services and System Aspects; 3G Security; Security Architecture (Release 6)", 3GPP TS 33.102 V6.5.0 (Dec. 2005).

Third Generation Partnership Project, "Technical Specification Group Services and System Aspects; 3G Security; Security Architecture (Release 7)", 3GPP TS 33.102 V7.1.0 (Dec. 2606).

Third Generation Partnership Project, "Technical Specification Group Radio Access Network; Radio Resource Control (RRC); Protocol Specification (Release 6)," 3GPP TS 25.331 V6.11.0 (Oct. 2006).

Third Generation Partnership Project, "Technical Specification Group Radio Access Network; Radio Resource Control (RRC); Protocol Specification (Release 6)," 3GPP TS 25.331 V6.12.0 (Dec. 2006).

Third Generation Partnership Project, "Technical Specification Group Radio Access Network; Radio Resource Control (RRC); Protocol Specifioation (Release 6)," 3GPP TS 25.331 V6.16.0 (Jan. 2008)

Third Generation Partnership Project, "Technical Specification Group Radio Access Network; Radio Resource Control (RRC); Protocol Specification (Release 7)," 3GPP TS 25.331 V7.3.0 (Dec. 2006).

Third Generation Partnership Project, "Technical Specification Group Radio Access Network; Radio Resource Control (RRC); Protocol Specification (Release 7)," 3GPP TS 25.331 V7.7.0 (Jan. 2008).

Third Generation Partnership Project, "Technical Specification Group Radio Access Network; Radio Resource Control (RRC); Protocol Specification (Release 8)," 3GPP TS 25.331 V8.1.0 (Jan. 2008).

Third Generation Partnership Project, "Technical Specification Group Radio Access Network; Evolved Universal Terrestrial Radio Access (E-UTRA); Packet Data Convergence Protocol (PDCP) specification (Release 8)," 3GPP TS 36.323 V8.0.0 (Dec. 2007).

Third Generation Partnership Project, "Technical Specification Group Radio Access Network; Evolved niversal Terrestrial Radio Access (E-UTRA) Radio Resource Control (RRC); Protocol specification (Release 8)," 3GPP TS 36.331 V8.0.0 (Dec. 2007).

* cited by examiner

METHOD AND APPARATUS FOR CIPHERING PACKET UNITS IN WIRELESS COMMUNICATIONS

CROSS REFERENCE TO RELATED APPLICATIONS

This application is a continuation of U.S. patent application Ser. No. 12/048,120 filed Mar. 13, 2008, and claims the benefit of U.S. provisional application No. 60/895,134 filed Mar. 15, 2007, which are incorporated by reference as if fully set forth.

FIELD OF INVENTION

This invention relates to wireless communication.

BACKGROUND

The third generation partnership project (3GPP) has lately initiated the Long Term Evolution (LTE) program to bring new technology, new network architecture, new configuration and new applications and services to the wireless cellular network in order to provide improved spectral efficiency and faster user experiences.

Universal Mobile Telecommunications System (UMTS) Ciphering Architecture

In UMTS systems such as Release 6, the ciphering function is performed either in the Radio Link Controller (RLC) sub-layer or in the Medium Access Control (MAC) sub-layer, according to the following rules:
  If a radio bearer is using a non-transparent RLC mode (Acknowledged Mode (AM) or Unacknowledged Mode (UM)), ciphering is performed in the RLC sub-layer.
  If a radio bearer is using the transparent RLC mode, ciphering is performed in the MAC sub-layer (dedicated MAC (MAC-d) entity).

For uplink traffic, ciphering is done in the Wireless Transmit/Receive Unit (WTRU) and deciphering in the Radio Network Controller (RNC), and for downlink traffic, ciphering is done in the RNC and deciphering in the WTRU.

The ciphering and integrity protection algorithms are described in 3GPP TS 33.102 V6.5.0 (2005-12). Of particular relevance are the COUNT-C (ciphering) and COUNT-I (integrity) input parameters, which are used by the ciphering and integrity protection algorithms respectively.

As shown in FIG. 1, a COUNT-C configuration, where the COUNT-C is utilized for performing ciphering on radio bearers using RLC TM 10 and COUNT-C is utilized for performing ciphering on radio bearer using RLC AM 30, or a RLC UM 20. For all transparent mode RLC radio bearers of the same core network (CN) domain, COUNT-C is the same, and COUNT-C is also the same for uplink and downlink.

The ciphering sequence number COUNT-C is 32 bits long. COUNT-C is composed of two parts: a "short" sequence number and a "long" sequence number. The "short" sequence number forms the least significant bits of COUNT-C while the "long" sequence number forms the most significant bits of COUNT-C, and is known as the Hyper Frame Number (HFN).

The update of COUNT-C depends on the transmission mode as described below:
  For RLC TM on Dedicated Channel (DCH), the "short" sequence number is the 8-bit connection frame number (CFN) of COUNT C. It is independently maintained in the WTRU MAC-d entity and the Servicing RNC (SRNC) MAC-d entity. The "long" sequence number is the 24-bit MAC-d HFN, which is incremented at each CFN cycle.
  For RLC UM mode, the "short" sequence number is the 7-bit RLC sequence number (RLC SN) and this is part of the RLC UM Protocol Data Unit (PDU) header. The "long" sequence number is the 25-bit RLC UM HFN which is incremented at each RLC SN cycle.
  For RLC AM mode, the "short" sequence number is the 12-bit RLC sequence number (RLC SN) and this is part of the RLC AM PDU header. The "long" sequence number is the 20-bit RLC AM HFN which is incremented at each RLC SN cycle.

The hyperframe number HFN is initialized by means of the parameter START. The WTRU and the RNC then initialize the 20 most significant bits of the RLC AM HFN, RLC UM HFN and MAC-d HFN to START. The remaining bits of the RLC AM HFN, RLC UM HFN and MAC-d HFN are initialized to zero. The hyper frame number is not explicitly transmitted with the packet.

Similarly, COUNT-I is composed of two parts: a "short" sequence number and a "long" sequence number. The "short" sequence number forms the least significant bits of COUNT-I, while the "long" sequence number forms the most significant bits of COUNT-I. The "short" sequence number is the 4-bit Radio Resource Control (RRC) sequence number (RRC SN) that is available in each RRC PDU. The "long" sequence number is the 28-bit RRC hyper frame number (RRC HFN) which is incremented at each RRC SN cycle.

LTE Architecture

FIG. 2 shows known LTE Layer 2 architecture in which the ciphering is done in the Packet Data Convergence Protocol (PDCP) layer 210 according to the current LTE architecture. The PDCP layer is located in the WTRU for the uplink traffic case, and used to be located in the access gateway (aGW) for the downlink traffic case according to the prior LTE decision.

Recently the Radio Access Network (RAN) WG3 in 3GPP made a decision to move ciphering and PDCP functionalities from the access gateway (aGW) to the enhanced Node B (eNB). As a result of this decision several issues need to be addressed in the area of devising a ciphering architecture that is effective and efficient.

RLC

Some of the main services and functions of the RLC sub-layer include:
  Transfer of upper layer PDUs supporting AM or UM;
  TM data transfer;
  Error Correction through automatic repeat request (ARQ) (Cyclic Redundancy Check (CRC) check provided by the physical layer, in other words no CRC needed at RLC level);
  Segmentation according to the size of the Transport Block (TB): only if an RLC Service Data Unit (SDU) does not fit entirely into the TB then the RLC SDU is segmented into variable sized RLC PDUs, which do not include any padding;
  Re-segmentation of PDUs that need to be retransmitted: if a retransmitted PDU does not fit entirely into the new TB used for retransmission then the RLC PDU is re-segmented;
  The number of re-segmentation is not limited;
  Concatenation of SDUs for the same radio bearer;
  In-sequence delivery of upper layer PDUs except at Handover (HO) in the uplink;

Duplicate Detection;

FIG. 3 shows the RLC PDU structure where the PDU sequence number carried by the RLC header 310 is independent of the SDU sequence number (i.e. PDCP sequence number). The division lines in SDUn 320 and SDUn+3 330 indicate occurrence of segmentation. Because segmentation only occurs when needed and concatenation is done in sequence, the content of an RLC PDU can generally be described by the following relations:

{0; 1} last segment of SDUi+[0; n] complete SDUs+{0; 1} first segment of SDUi+n+1; or 1 segment of SDUi.

FIG. 3 and FIG. 4 describe some of the RLC functions. The RLC layer receives RLC SDUs from the layer above it (i.e. PDCP); based on the size of the Transport Block (TB) to be sent in a Transmission Time Interval (TTI), the RLC either segments the SDU, leaves the SDU as is, or creates a concatenation of SDUs and segments 410, in a manner that maximizes the utilization of the TB. This results in an initial RLC PDU that gets transmitted. The initial RLC PDU 420 (or its constituent information) will also be kept in a retransmission (ReTx) buffer 430 until it is successfully acknowledged. In case of errors or lack of reception, the unacknowledged PDU may be retransmitted by ARQ either as is, or may undergo PDU re-segmentation 440 where the PDU is further segmented into sub-PDU's for retransmission 450. Hence the RLC retransmission unit is the RLC PDU or an RLC Sub-PDU depending on whether re-segmentation is performed or not.

In the RLC PDU re-segmentation scheme, there are two levels of identifications employed by the RLC:
1) RLC PDU SN to identify the RLC PDU
2) RLC Sub-PDU identifier, which could take the form of either:
    a. SN, e.g. Sub-PDU SN, or:
    b. Offset and Length, e.g. in Bytes, relative to the PDU.

In the RLC SDU re-segmentation scheme, there are two levels of identifications employed by the RLC:
1) RLC SDU SN to identify the RLC SDU
2) RLC Sub-SDU identifier, which could take the form of either:
    a. SN, e.g. Segment SN or Sub-SDU SN, or:
    b. Offset and Length, e.g. in Bytes, relative to the SDU.

PDU re-segmentation is described, but SDU re-segmentation is also possible. FIG. 5 illustrates an example implementation that performs SDU re-segmentation.

What is needed are different alternatives for efficient and/or low complexity user plane architectures designed to support ciphering operation in an efficient and/or low complexity manner; where the prior art does not provide alternatives of MAC and RLC ciphering.

In UMTS systems, there was only one level of RLC segmentation, and there was no RLC re-segmentation. LTE RLC re-segmentation introduces problems in regards to how the ciphering SN (C-COUNT) is to be constructed efficiently. This is further complicated by being dependent on the various numbering schemes that may be employed by RLC for other functions such as ARQ and reordering.

SUMMARY

A method and apparatus are disclosed for ciphering and de-ciphering of packet units in wireless devices during retransmission in wireless communications. Processing of a packet unit (PU) in a radio link control (RLC) layer for retransmission includes buffering the PU, re-segmenting of the PU in the buffer, performing a ciphering process on the PU or the re-segmented PU, and retransmitting the ciphered and re-segmented PU.

BRIEF DESCRIPTION OF THE DRAWINGS

A more detailed understanding of the invention may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 14:
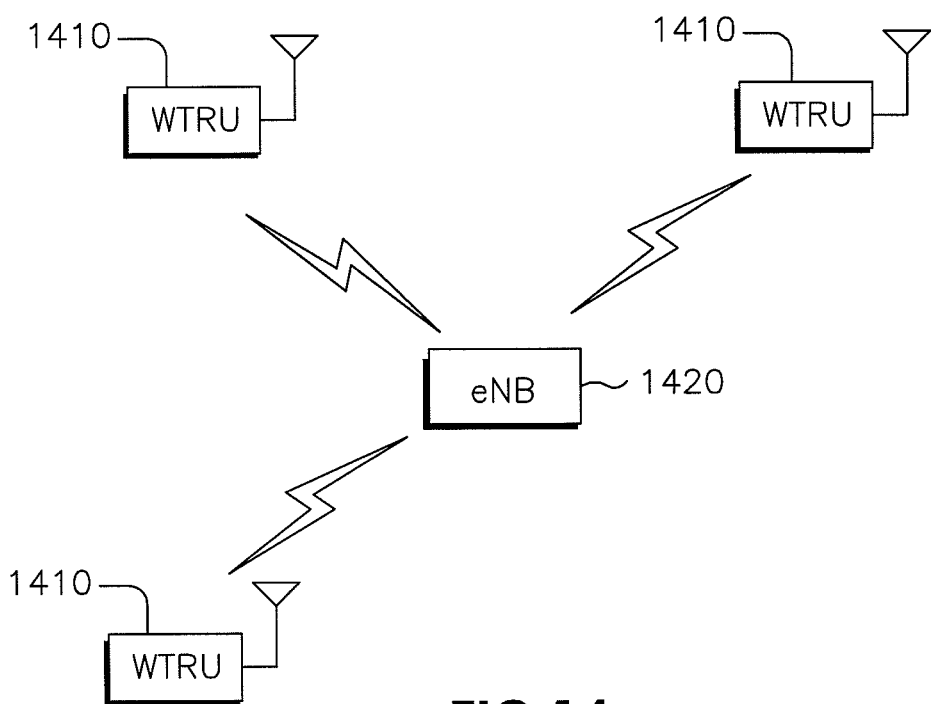
FIG. 14 shows a wireless communications system.

FIG. 14 shows a wireless communication network. The wireless communication network in FIG. 14 includes a plurality of WTRUs 1410 and an eNB 1420. As shown in FIG. 14, the WTRUs 1410 are in communication with the eNB 1420. Although three WTRUs 1410 and one eNB 1420 are shown in FIG. 14, it should be noted that any combination of wireless and wired devices may be included in the wireless communication network.

Figure 15:
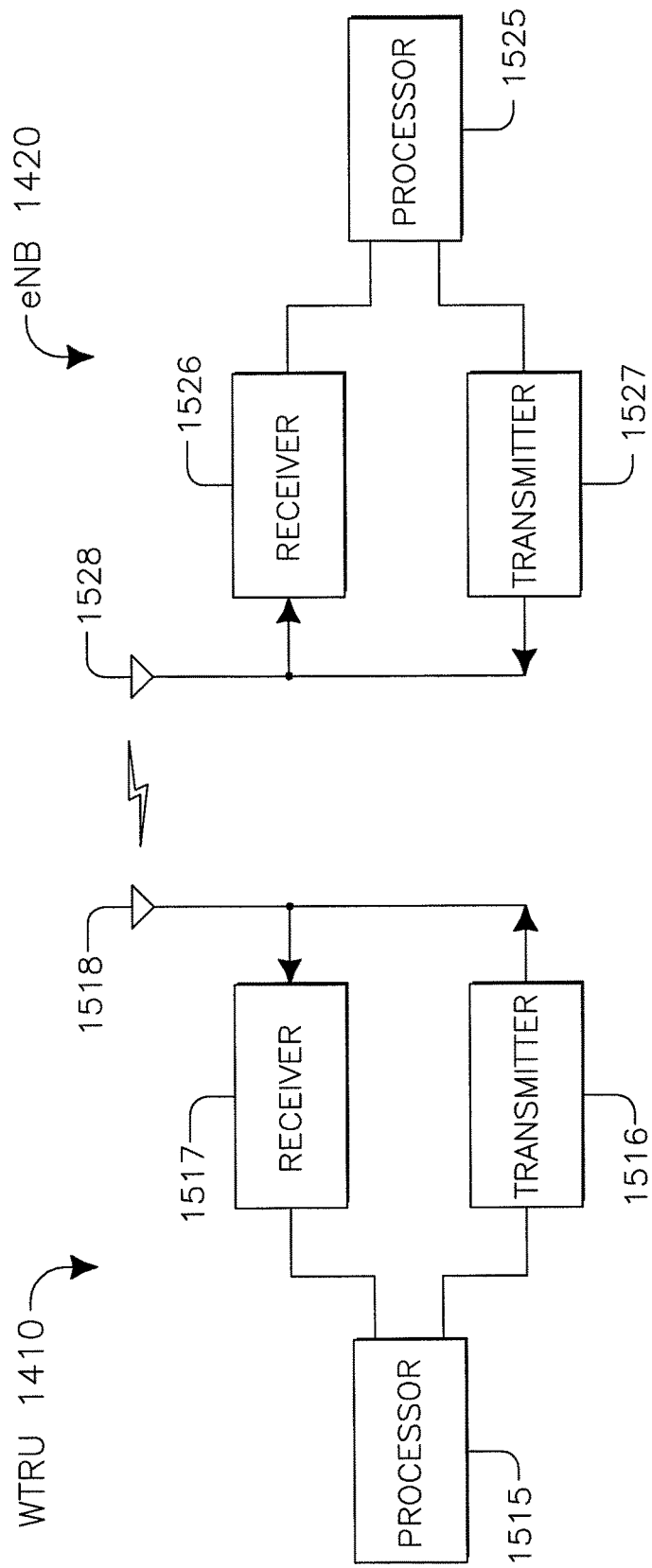
FIG. 15 is a functional block diagram of a WTRU and an enhanced Node B (eNB).

FIG. 15 is a functional block diagram of a WTRU 1410 and the eNB 1420 of the wireless communication network of FIG. 14. As shown in FIG. 14, the WTRU 1410 is in communication with the enhance Node B (eNB) 1420 and both are configured to perform a method of re-segmentation of the stored PU in a buffer in their respective processors 1515 and 1525 for retransmission.

In addition to the components that may be found in a typical WTRU, the WTRU 1410 includes the processor with a buffer 1515, a receiver 1517, a transmitter 1516, and an antenna 1518. The processor 1515 may be configured to perform de-ciphering of re-segmented Packet Unit (PU) from downlink wireless data from the eNB 1420 and ciphering on the re-segmentation of the PUs of uplink wireless data of the WTRU 1410. The receiver 1517 and the transmitter 1516 are in communication with the processor 1515. The antenna 1518 is in communication with both the receiver 1517 and the transmitter 1516 to facilitate the transmission and reception of wireless data.

In addition to the components that may be found in a typical eNB 1420, the eNB 1420 includes the processor with a buffer 1525, a receiver 1526, a transmitter 1527, and an antenna 1528. The processor 1525 is configured to perform de-ciphering of the received re-segmented PUs from uplink wireless data from the WTRU 1410, and ciphering of the re-segmentation of PUs of downlink wireless data to WTRU 1410. The receiver 1526 and the transmitter 1527 are in communication with the processor 1525. The antenna 1528 is in communication with both the receiver 1526 and the transmitter 1527 to facilitate the transmission and reception of wireless data.

Ciphering at the RLC Layer

Some or all of the embodiments described may be applied to any mode of RLC operation (e.g. AM, UM or TM), although the examples focus on RLC AM operation which utilizes ARQ retransmission.

Ciphering in RLC: Alternative 1

Figure 1:
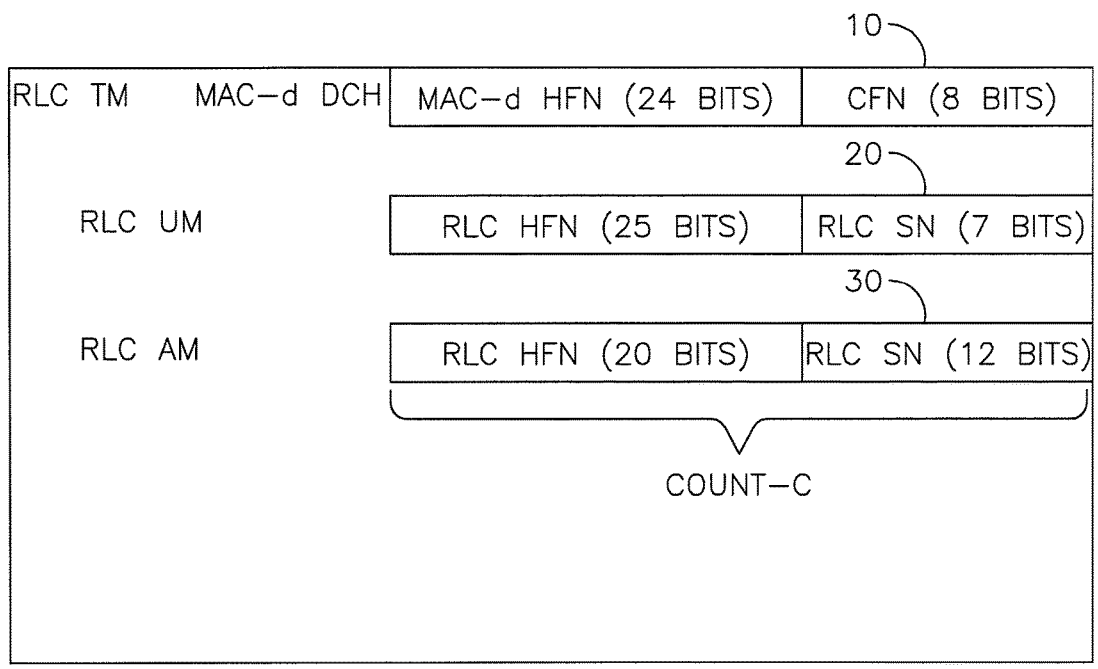
FIG. 1 shows a ciphering sequence number Count-C configuration used by RLC.
Figure 2:
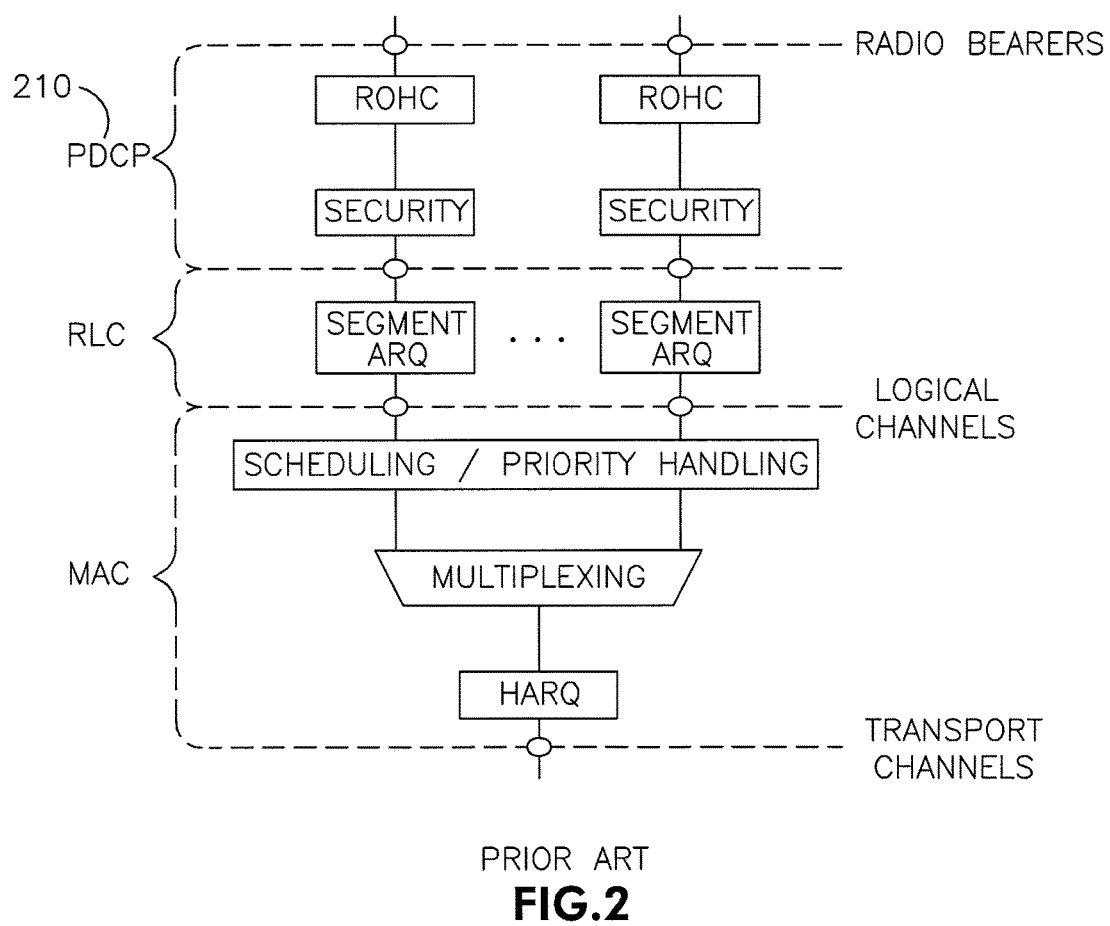
FIG. 2 illustrates an LTE Layer 2 architecture in which the ciphering is done in the PDCP layer according to the known LTE architecture.
Figure 3:
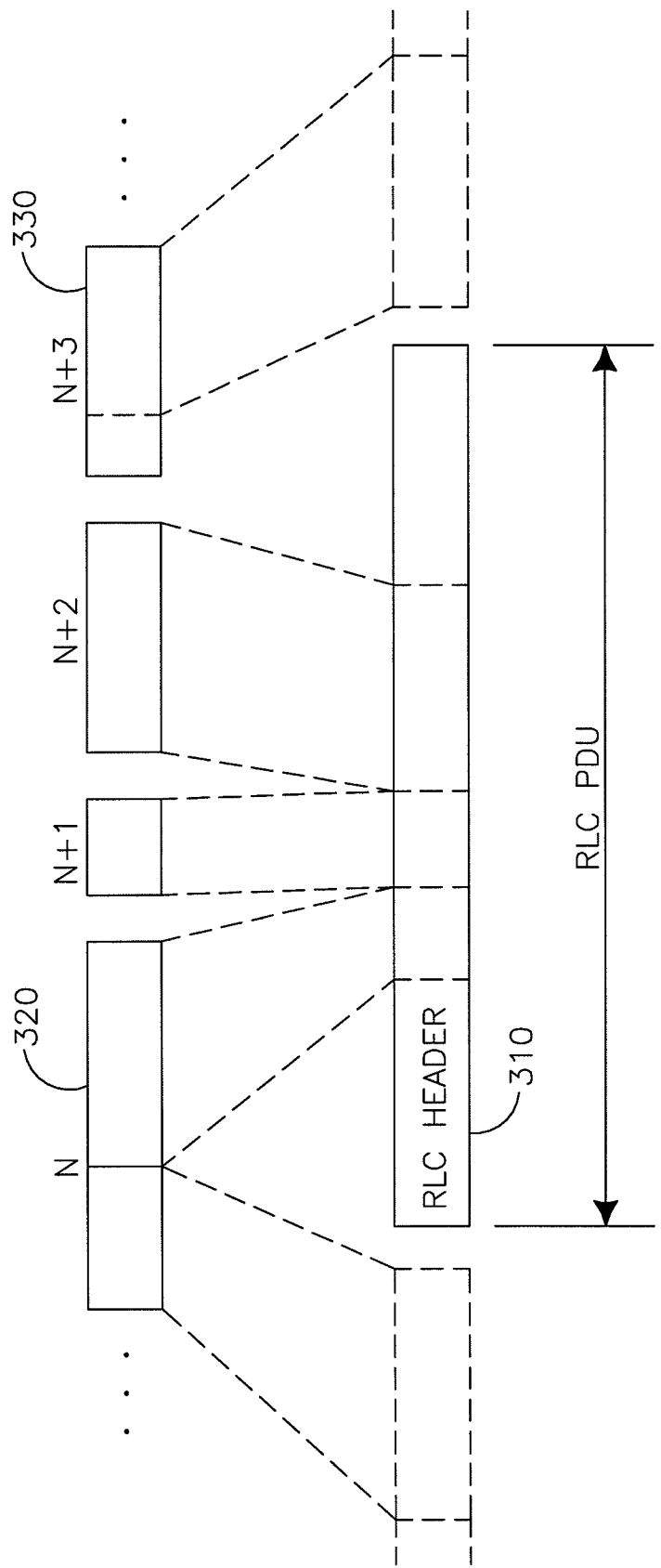
FIG. 3 shows an RLC PDU may contain a segment of an SDU, or a concatenation of SDUs and segments.
Figure 4:
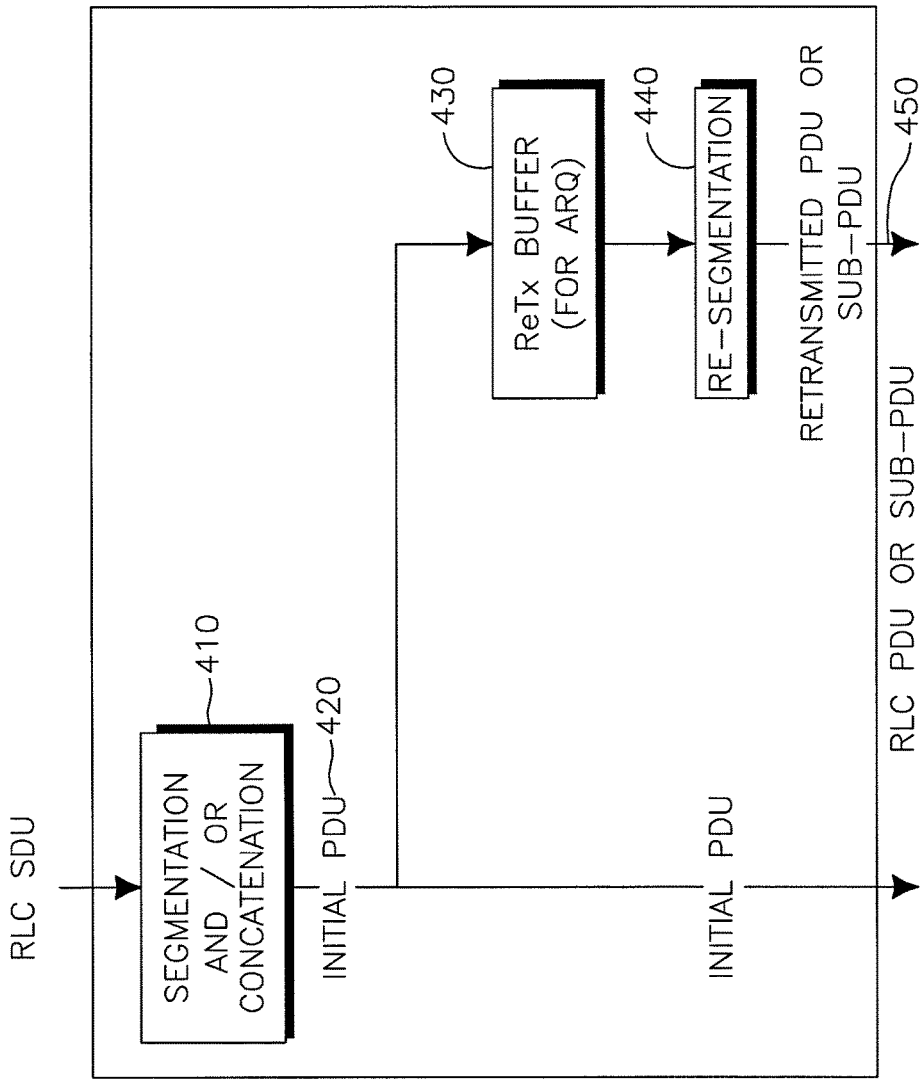
FIG. 4 shows some of the RLC functions, assuming re-segmentation is performed on RLC PDUs.
Figure 5:
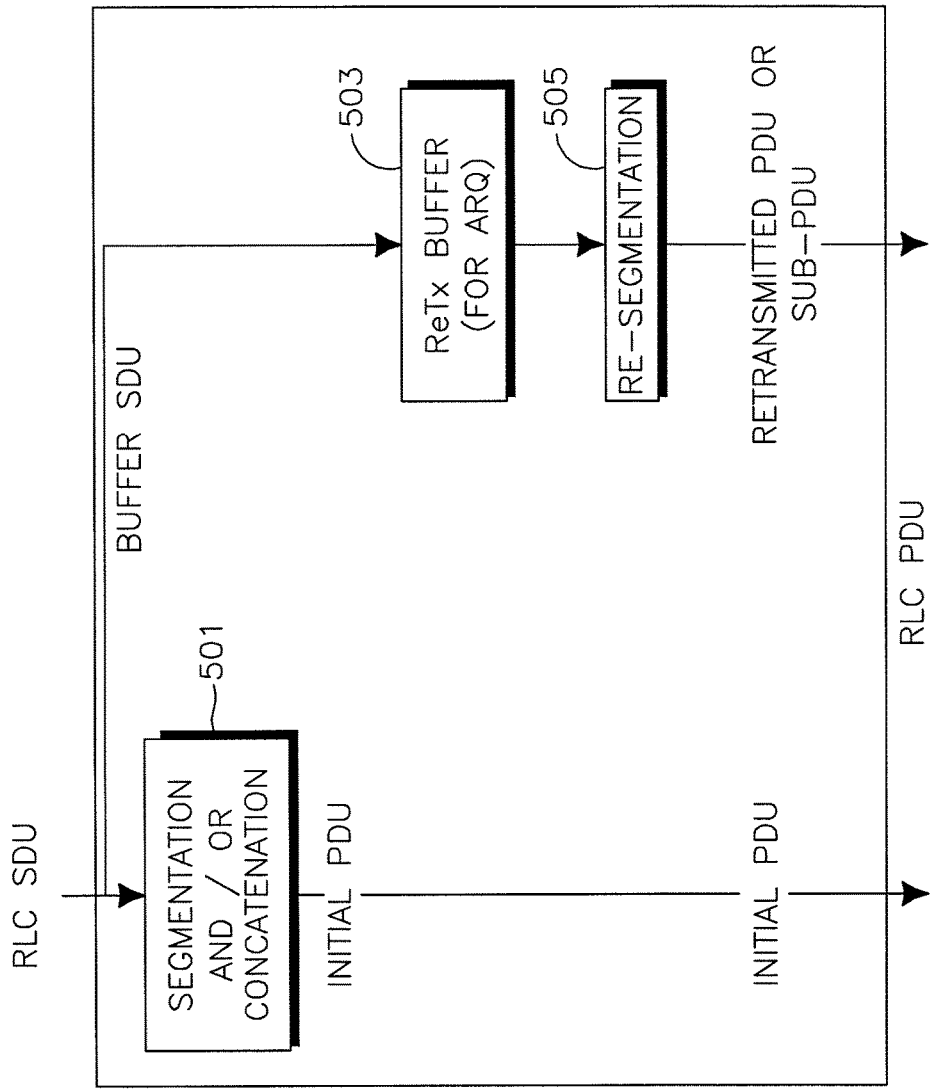
FIG. 5 illustrates some of the RLC functions, assuming re-segmentation is performed on RLC SDUs.
Figure 6A:
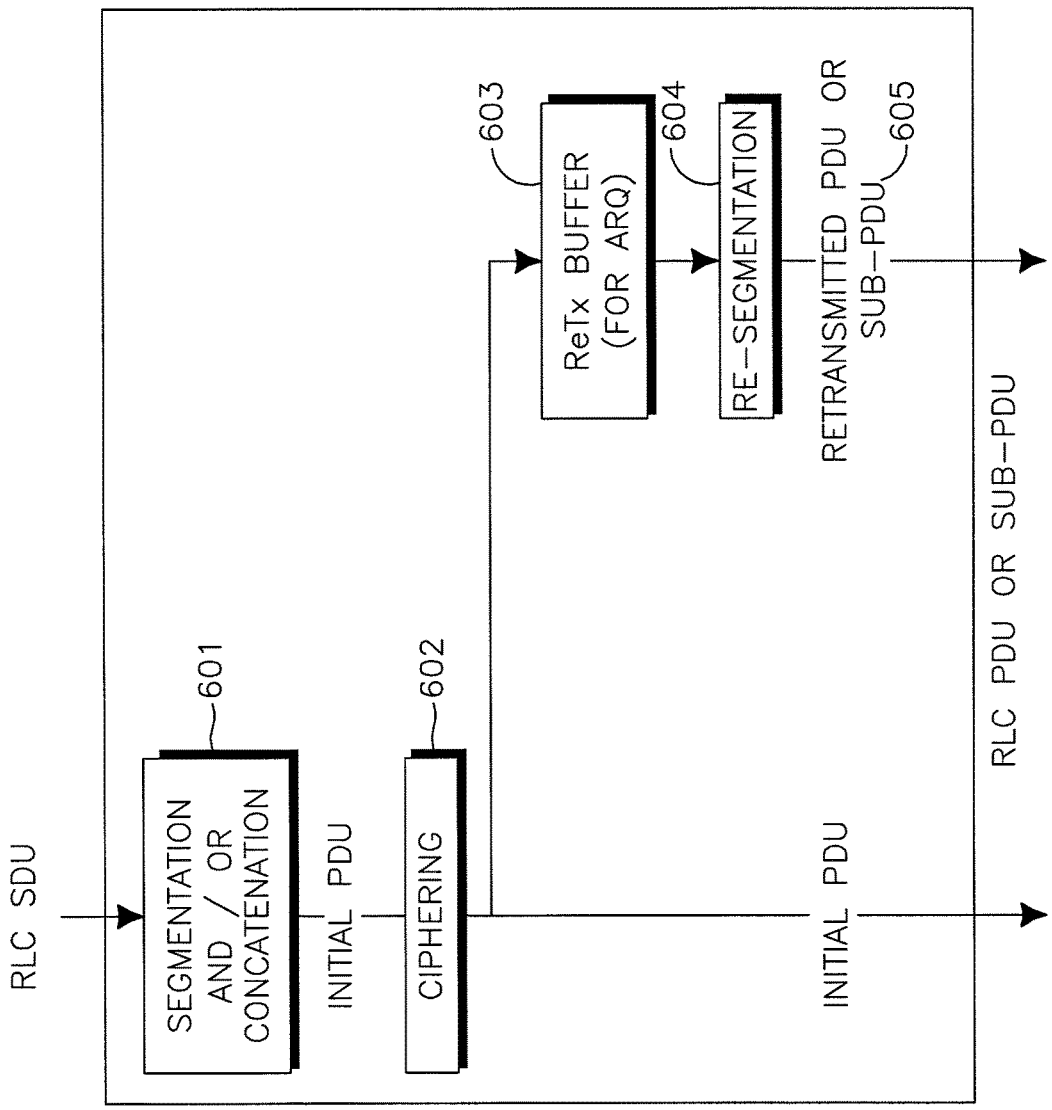
FIG. 6A shows ciphering performed on RLC PDUs but not on RLC Sub-PDUs if retransmission occurs.

The transmitting node that is performing the ciphering operation (i.e. the WTRU for uplink traffic, and the eNB for downlink traffic) preferably performs ciphering on the initial PDUs created by the RLC and will not perform ciphering again on the Sub-PDUs that are retransmitted by the RLC, as shown in FIG. 6A.

According to this architecture, the transmitting node (TXN) (i.e. the WTRU in case of uplink traffic direction, and the eNB in case of downlink traffic direction) will perform the following procedure as shown in FIGS. 6B-6F:

First, the TXN may perform segmentation and concatenation 601 on one or more of the RLC SDU(s) and create an initial RLC PDU The TXN will cipher the payload of the initial RLC PDU 602 (initial here refers to the first level of segmentation/concatenation operation, as opposed to further levels)

The TXN will store a copy of the ciphered initial RLC PDU in the ReTx buffer 603, to support future retransmission if needed The TXN will transmit the ciphered initial RLC PDU In case ARQ retransmission is required:

The TXN will use the ciphered initial RLC PDU stored in the ReTx buffer

The TXN may re-segment the stored PDU 604 and create one or more Sub-PDUs 605

The retransmitted RLC PDUs or Sub-PDUs are not re-ciphered.

Figure 16:
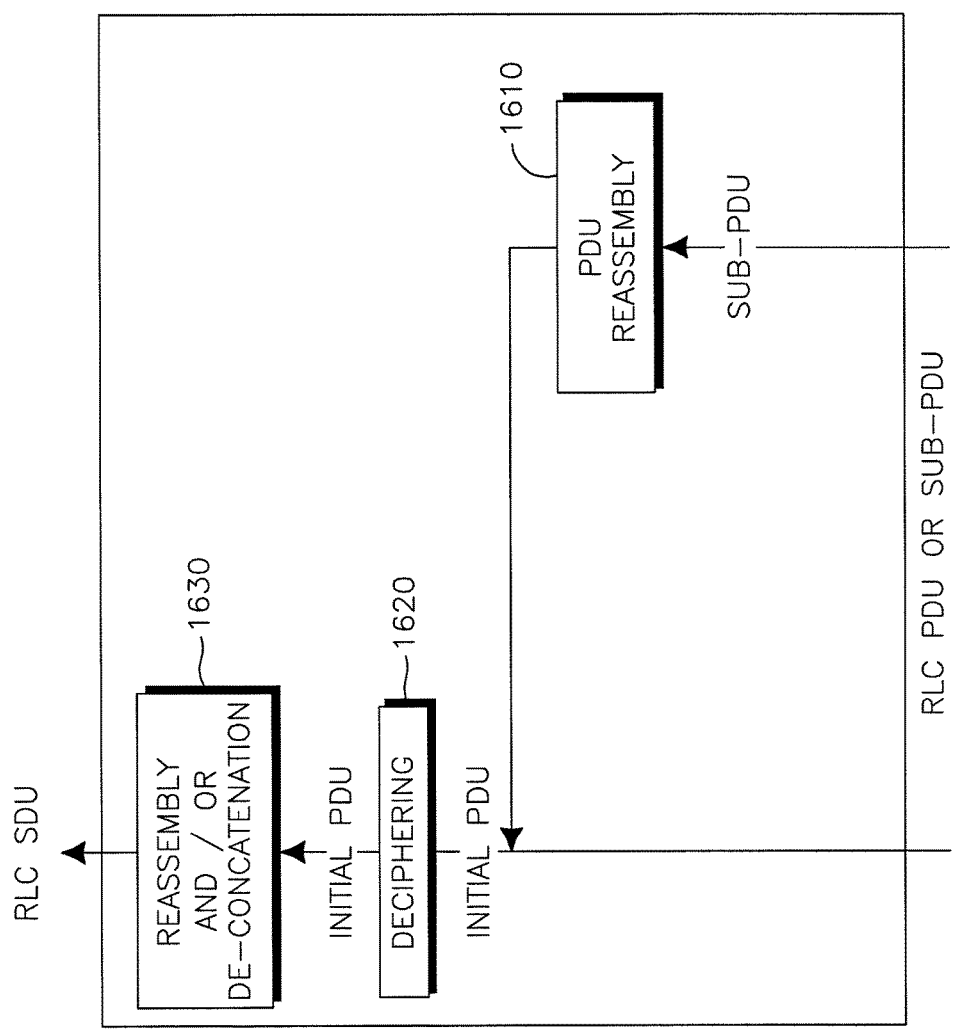
FIG. 16 shows a RXN procedure from the ciphering performed on RLC PDUs but not on RLC Sub-PDUs.

In FIG. 16, the receiving node (RXN) (i.e. the WTRU in case of downlink traffic direction, and the eNB in case of uplink traffic direction) will perform the following procedure:

First, the RXN reassemble an initial RLC PDU from multiple Sub-PDUs, or from a single PDU in case no re-segmentation was done 1610

The RXN will decipher the payload of the initial RLC PDU 1620

The RXN will reassemble the RLC SDU from multiple PDUs in case segmentation was done, or from a single PDU in case no segmentation was done; The RXN will de-concatenate the RLC SDUs from the PDU in case concatenation was done 1630.

Although the operations described above assume PDU re-segmentation is performed, the schemes described above apply as well when SDU re-segmentation is employed instead.

In this RLC ciphering Alternative 1, the ciphering sequence number such as COUNT-C will preferably make use of the sequence number(s) or packet identifiers that are provided by the RLC. Depending on how the RLC provides sequence numbering and packet identification, different variants can exist:

Variant 1: RLC PDU SN

Figure 6B:
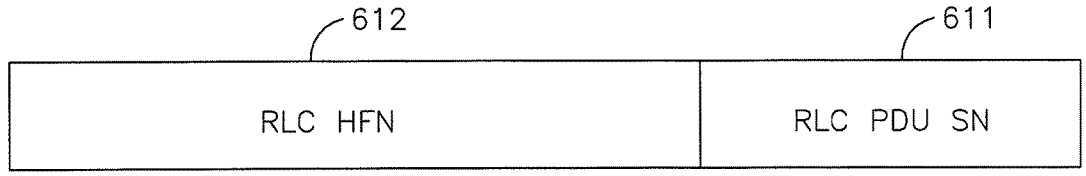
FIGS. 6B-6F show variations of Count-C configurations according to a first embodiment.

In FIG. 6B, if the RLC performs numbering on an RLC PDU level (i.e. PDU SN), the COUNT-C will be constructed from the RLC PDU SN 611 and a RLC HFN 612.

The RLC HFN is incremented at each RLC PDU SN cycle.

Variant 2: RLC SDU SN+RLC Segment Offset/Length

Figure 6C:
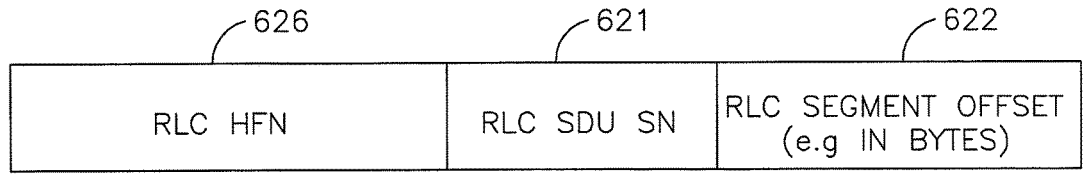
Figure 6C:
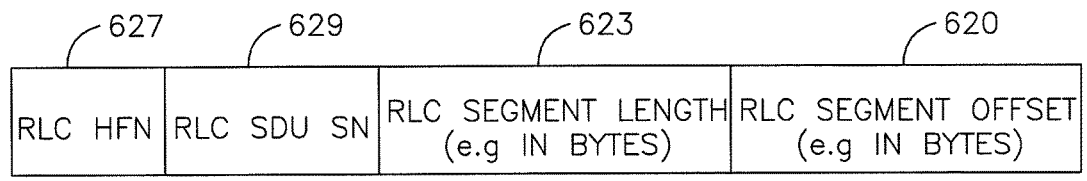
Figure 6C:
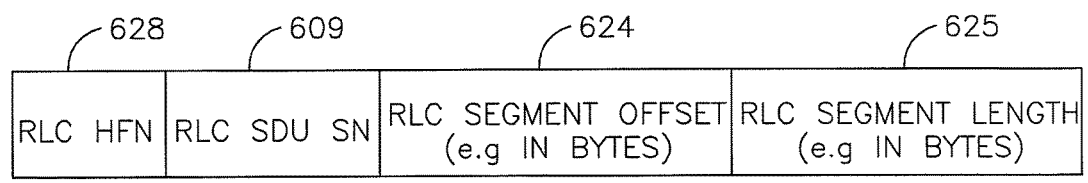

In FIG. 6C, if the RLC performs numbering on an RLC SDU level (i.e. SDU SN), and identifies segments (i.e. Sub-SDUs) using offset and length (e.g. in bytes), the COUNT-C will be constructed from the RLC SDU SN 621, 629, 609, and either all or parts (e.g. LSB's) of the RLC segment offset 620, 622, 624 or/and length fields 623, 625, and an RLC HFN 626, 627,628.

The RLC HFN is incremented at each RLC SDU SN cycle, since the RLC Segment Offset or Length fields may have gaps (i.e. values that will never be reached or assigned); i.e. even if the Segment offset or length fields does not roll over (since it may not reach its maximum), the RLC HFN will be incremented whenever the RLC SDU SN rolls over (upon reaching its maximum).

Variant 3: RLC SDU SN+RLC Segment Number

Figure 6D:
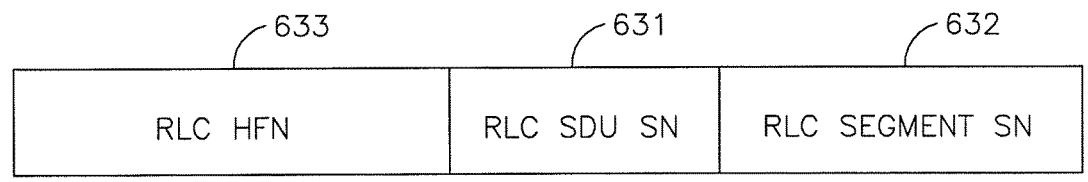

In FIG. 6D, if the RLC performs numbering on an RLC SDU level (i.e. SDU SN), and identifies segments (i.e. Sub-SDUs) using segment sequence numbers, the COUNT-C will be constructed from the RLC SDU SN 631, and the RLC segment number 632, and a RLC HFN 633.

The RLC HFN is incremented at each RLC SDU SN cycle, since the RLC Segment SN field may have gaps (i.e. values that will never be reached or assigned); that is even if the RLC Segment SN does not roll over (since it may not reach its maximum), the RLC HFN will be incremented whenever the RLC SDU SN rolls over (upon reaching its maximum).

Variant 4: RLC SDU SN+RLC Derived SN

Figure 6E:
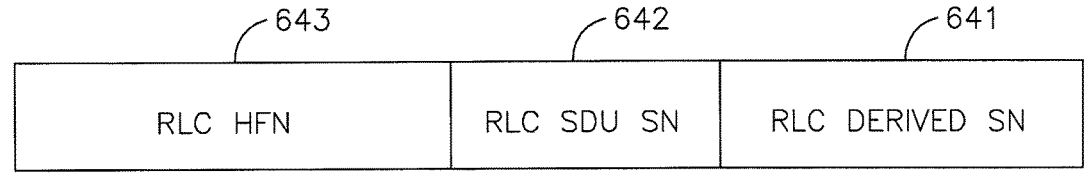

In FIG. 6E, an alternative variation would be to not directly use the RLC numbers utilized for RLC reassembly and reordering operations, but rather create another SN to be dedicated for ciphering purposes, whereby the COUNT-C will be constructed from the new RLC derived SN 641, the RLC SDU SN 642, and a RLC HFN 643. The new RLC derived SN may be a function of existing RLC numbers/identifiers (e.g. offset/length), or may be independently assigned.

The RLC HFN is incremented at each RLC SDU SN cycle; alternatively, the HFN is incremented at each RLC SDU SN and RLC Derived SN cycle.

Variant 5: New RLC Ciphering SN

Figure 6F:
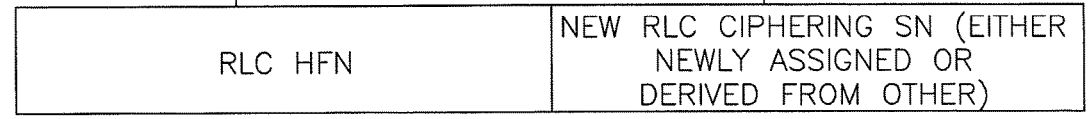

In FIG. 6F, an alternative variation would be to not directly use the RLC numbers utilized for RLC reassembly and reordering operations, but rather create another SN to be dedicated for ciphering purposes, whereby the COUNT-C will be constructed from the new ciphering SN 651, and a RLC HFN 652. The new RLC ciphering SN may be a function of existing RLC numbers/identifiers, or may be independently assigned.

The RLC HFN is incremented at each RLC Ciphering SN cycle.

It should be noted that FIGS. 6B-6F are not drawn to scale and are not aimed to be indicative of the relative size or actual number of bits that constitute each field. Also, the total number of bits in COUNT-C may remain as 32 bits, or may be changed, e.g. increased to a larger number of bits (e.g. 64 bits) or any other number. For the integrity protection algorithm/operation, COUNT-I may be constructed utilizing similar schemes/principles to the above in certain cases.

The variants 1-5 for this embodiment:
- Do not require re-ciphering of re-transmitted PDUs or Sub-PDUs
- Ciphering sequence number (i.e. COUNT-C) may reuse/make use of existing RLC SN and/or identifiers as input(s), hence resulting in reduced overhead.

Ciphering in RLC: Alternative 2

Figure 7:
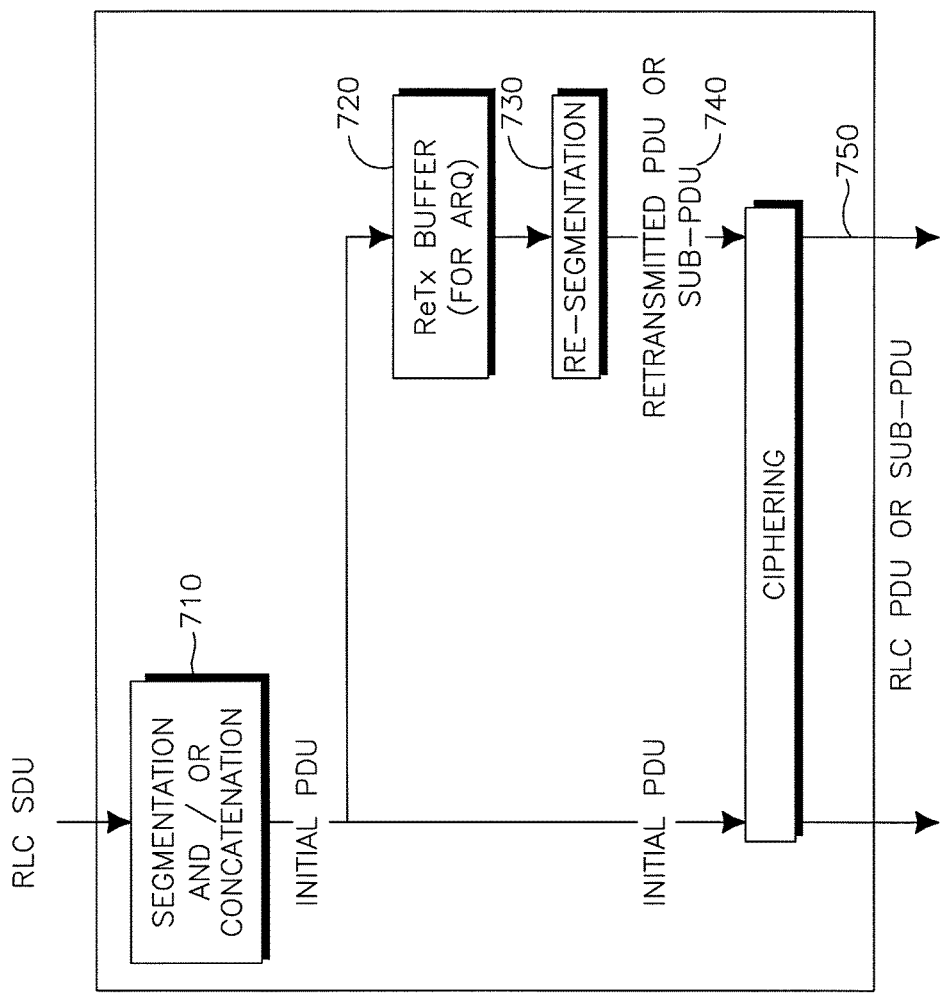
FIG. 7 shows ciphering performed on RLC PDUs and also on RLC Sub-PDUs if retransmission occurs according to a second embodiment.

In FIG. 7, the transmitting node that is performing the ciphering operation (i.e. the UE for uplink traffic, and the eNB for downlink traffic) will perform ciphering on the initial PDUs created by the RLC and will also perform ciphering again on the Sub-PDUs or PDUs that are retransmitted by the RLC.

According to the architecture, the transmitting node (TXN) (i.e. the WTRU in case of uplink traffic direction, and the eNB in case of downlink traffic direction) will perform the following procedure:

First, the TXN may perform segmentation and concatenation 710 on one or more of the RLC SDU(s) and create an initial RLC PDU The TXN will store a copy of the non-ciphered initial RLC PDU in the ReTx buffer 720, to support future retransmission if needed The TXN will cipher the payload of the initial RLC PDU ("initial" here refers to the first level of segmentation/concatenation operation, as opposed to further levels)

The TXN will transmit the ciphered initial RLC PDU.

In case ARQ retransmission is required:

The TXN will use the non-ciphered initial RLC PDU stored in the ReTx buffer 720

The TXN may re-segment the stored PDU 730 and create one or more Sub-PDUs 740

The TXN will cipher the payload of the created PDUs or Sub-PDUs 750

The retransmitted RLC PDUs or Sub-PDUs will be ciphered.

Figure 17:
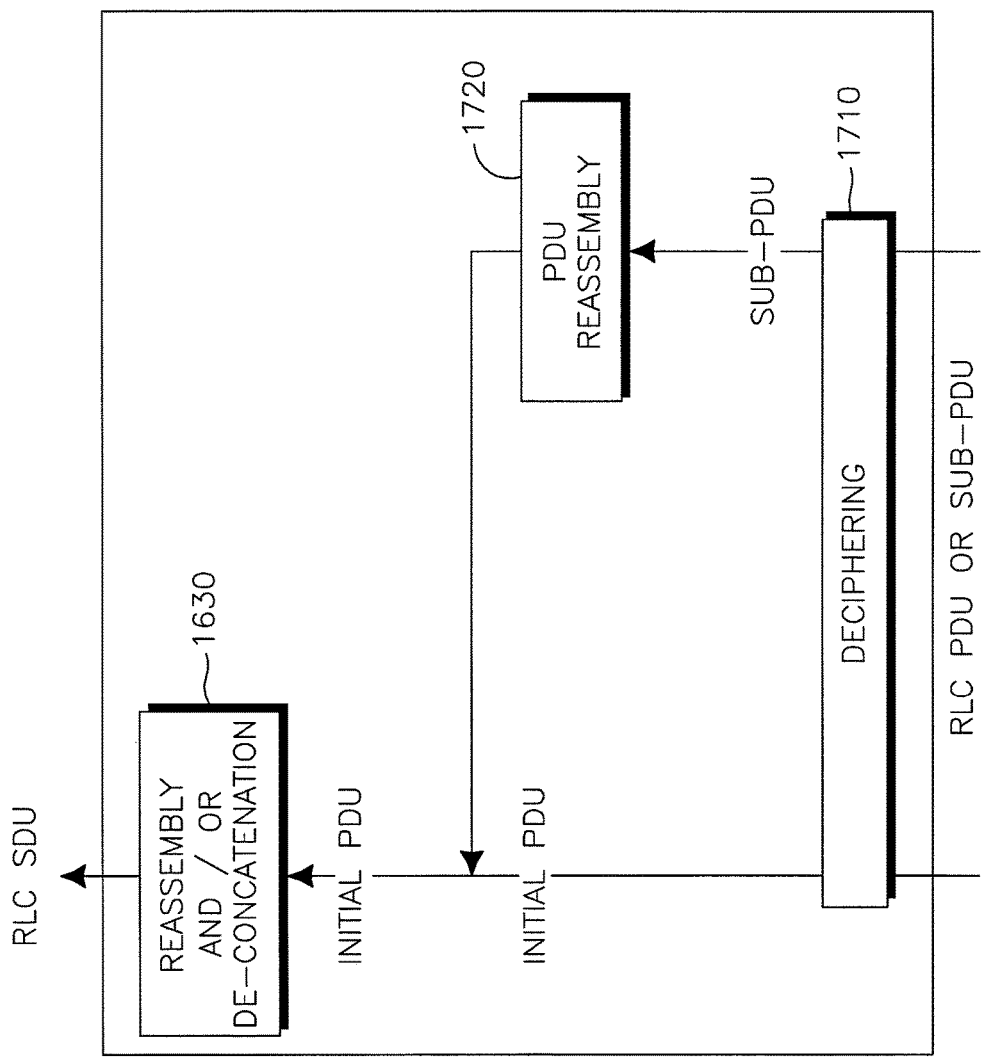
FIG. 17 shows a RXN procedure from the ciphering performed on RLC PDUs and also on RLC Sub-PDUs.

As shown in FIG. 17, according to this architecture, the receiving node (RXN) (i.e. the UE in case of downlink traffic direction, and the eNB in case of uplink traffic direction) will perform the following procedure:

First, the RXN will decipher the payload of the initial RLC PDUs or Sub-PDUs it receives 1710.

The RXN reassemble an initial RLC PDU from multiple Sub-PDUs or from a single PDU in case no re-segmentation was done 1720

The RXN will reassemble the RLC SDU from multiple PDUs in case segmentation was done, or from a single PDU in case no segmentation was done; The RXN will de-concatenate the RLC SDUs from the PDU in case concatenation was done 1730.

Although the operations above assume PDU re-segmentation is performed, the schemes described above can apply when SDU re-segmentation is employed instead.

In this RLC ciphering Alternative 2, the ciphering sequence number such as COUNT-C will preferably make use of the sequence number(s) or packet identifiers that are provided by the RLC. Depending on how the RLC provides sequence numbering and packet identification, different variants can exist:

Variant 1: RLC PDU SN+RLC Sub-PDU Offset/Length

Figure 8A:
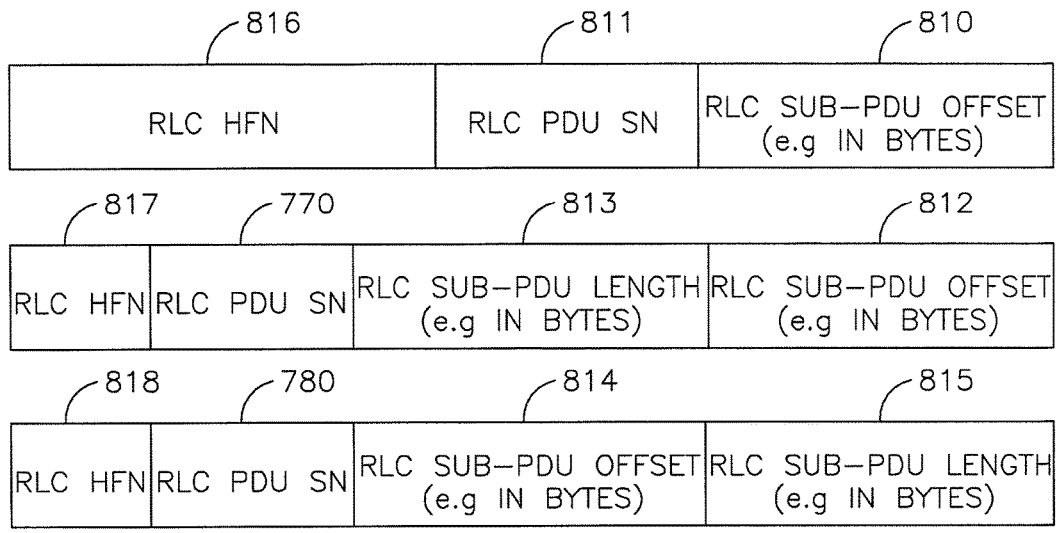
FIGS. 8A-8H show variations of Count-C configurations according to a second embodiment.

In FIG. 8A, if the RLC performs numbering on an RLC PDU level (i.e. PDU SN), and identifies sub-segments (i.e. Sub-PDUs) using offset and length (e.g. in bytes), the COUNT-C will be constructed from the RLC PDU SN 770, 780, 811, and either all or parts (e.g. LSB's) of the RLC Sub-PDU offset 810, 812, 814 or/and length fields 813, 815, and a RLC HFN 816, 817, 818. For an Initial PDU (as opposed to a Sub-PDU), the offset and/or length fields may either be set to zeros in the COUNT-C, or automatically padded to zeros by the ciphering engine.

The RLC HFN is incremented at each RLC PDU SN cycle, since the RLC Sub-PDU Offset or Length fields may have gaps (i.e. values that will never be reached or assigned); i.e. even if the Sub-PDU offset or length fields does not roll over (since it may not reach its maximum), the RLC HFN will be incremented whenever the RLC PDU SN rolls over (upon reaching its maximum).

Variant 2: RLC PDU SN+Sub-PDU SN

Figure 8B:
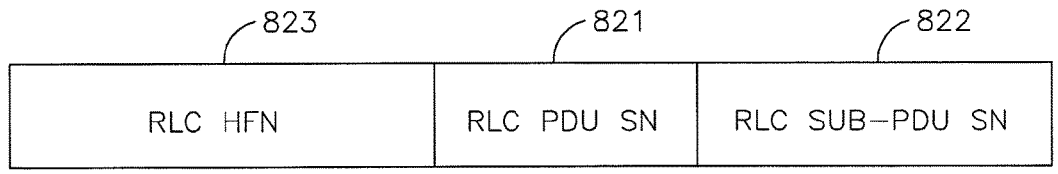

In FIG. 8B, if the RLC performs numbering on an RLC PDU level (i.e. PDU SN), and identifies sub-segments (i.e. Sub-PDUs) using sequence numbers, the COUNT-C will be constructed from the RLC PDU SN 821, and the RLC Sub-PDU SN 822, and a RLC HFN 823. For an Initial PDU (as opposed to a Sub-PDU), the RLC Sub-PDU SN field may either be set to zeros in the COUNT-C, or automatically padded to zeros by the ciphering engine.

The RLC HFN is incremented at each RLC PDU SN cycle, since the RLC Sub-PDU SN field may have gaps (i.e. values that will never be reached or assigned); that is even if the RLC Sub-PDU SN does not roll over (since it may not reach its maximum), the RLC HFN will be incremented whenever the RLC PDU SN rolls over (upon reaching its maximum).

Variant 3: RLC PDU SN+Derived SN

Figure 8C:
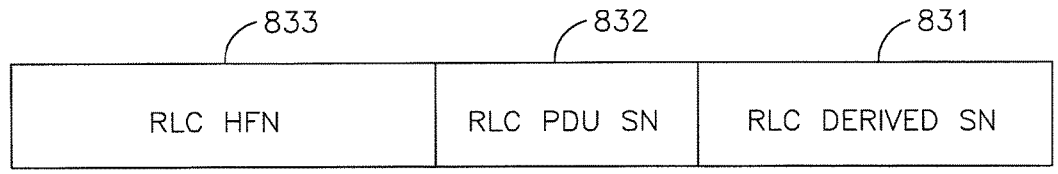

In FIG. 8C, an alternative variation would be to not directly use the RLC numbers utilized for RLC reassembly and reordering operations, but rather create another SN to be dedicated for ciphering purposes, whereby the COUNT-C will be constructed from the new RLC derived SN 831, the RLC PDU SN 832, and a RLC HFN 833. The new RLC derived SN may be a function of existing RLC numbers/identifiers (e.g. offset/length), or may be independently assigned. For an Initial PDU (as opposed to a Sub-PDU), the RLC derived SN field may either be set to zeros in the COUNT-C, or automatically padded to zeros by the ciphering engine.

The RLC HFN is incremented at each RLC PDU SN cycle; alternatively, the RLC HFN is incremented at each RLC PDU SN and RLC Derived SN cycle.

Variant 4: RLC SDU SN+RLC Segment Offset/Length

Figure 8D:
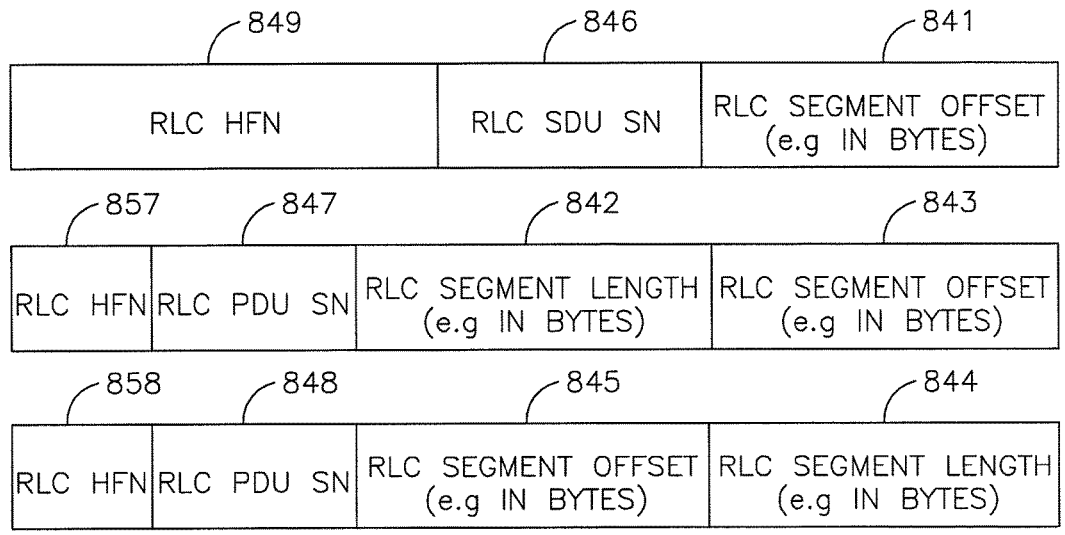

In FIG. 8D, if the RLC performs numbering on an RLC SDU level (i.e. SDU SN), and identifies segments (i.e. Sub-SDUs) using offset and length (e.g. in bytes), the COUNT-C will be constructed from the RLC SDU SN 846, 847, 848, and either all or parts (e.g. LSB's) of the RLC segment offset(s) 841, 843, 845 or/and RLC length fields 842, 844, and a RLC HFN 849, 857, 858. The RLC HFN is incremented at each RLC SDU SN cycle, since the RLC Segment Offset or Length fields may have gaps (i.e. values that will never be reached or assigned); i.e. even if the Segment offset or length fields does not roll over (since it may not reach its maximum), the RLC HFN will be incremented whenever the RLC SDU SN rolls over (upon reaching its maximum).

Variant 5: RLC SDU SN+Segment Number

Figure 8E:
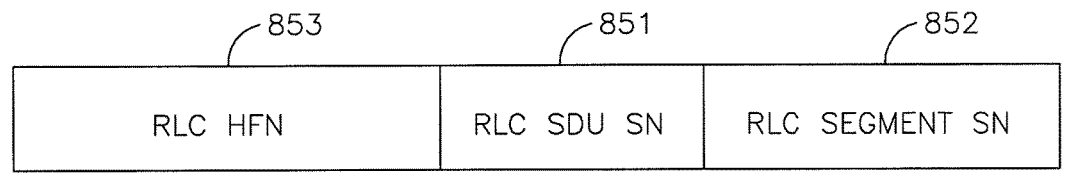

In FIG. 8E, if the RLC performs numbering on an RLC SDU level (i.e. SDU SN), and identifies segments (i.e. Sub-SDUs) using segment sequence numbers, the COUNT-C will be constructed from the RLC SDU SN (851), and the RLC segment number 852, and a RLC HFN 853.

The RLC HFN is incremented at each RLC SDU SN cycle, since the RLC Segment SN field may have gaps (i.e. values that will never be reached or assigned); that is even if the Segment SN does not roll over (since it may not reach its maximum), the RLC HFN will be incremented whenever the RLC SDU SN rolls over (upon reaching its maximum).

Variant 6: RLC SDU SN+RLC Derived SN

Figure 8F:
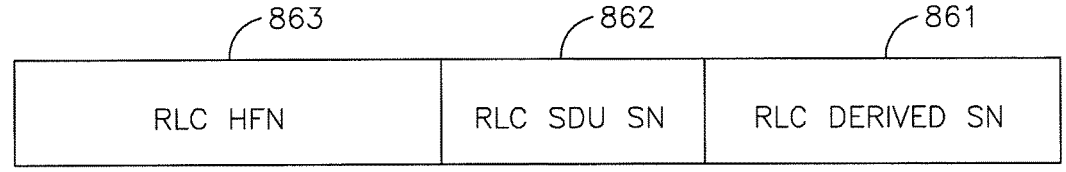

In FIG. 8F, an alternative variation would be to not directly use the RLC numbers utilized for RLC reassembly and reordering operations, but rather create another SN to be dedicated for ciphering purposes, whereby the COUNT-C will be constructed from the new RLC derived SN 861, the RLC SDU SN 862, and a RLC HFN 863. The new RLC derived SN may be a function of existing RLC numbers/identifiers (e.g. offset/length), or may be independently assigned.

The RLC HFN is incremented at each RLC SDU SN cycle; alternatively, the HFN is incremented at each RLC SDU SN and RLC Derived SN cycle.

Variant 7: New Ciphering SN

Figure 8G:
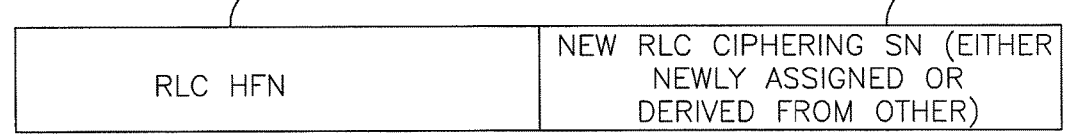

In FIG. 8G, an alternative variation would be to not directly use the RLC numbers utilized for RLC reassembly and reordering operations, but rather create another SN to be dedicated for ciphering purposes, whereby the COUNT-C will be constructed from the new RLC ciphering SN 871, and a RLC HFN 872. The new RLC ciphering SN may be a function of existing RLC numbers/identifiers, or may be independently assigned.

The RLC HFN is incremented at each RLC Ciphering SN cycle.

Variant 8: New RLC Transmission SN

Figure 8H:
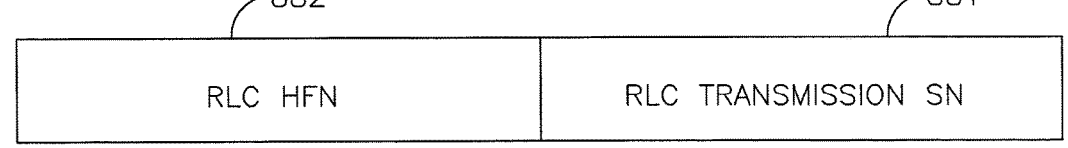

In FIG. 8H, an alternative variation would be to not directly use the RLC numbers utilized for RLC reassembly and reordering operations, but rather create another RLC Transmission SN to be assigned across all packets transmitted from the RLC, or across only those packets belonging to one logical channel (i.e. per logical channel SN) or to certain RLC modes (e.g. per-AM mode SN), whereby the COUNT-C will be constructed from the new RLC Transmission SN 881, and a RLC HFN 882.

The RLC HFN is incremented at each RLC Transmission SN cycle.

In FIGS. 8A-8H, the fields are not drawn to scale and are not aimed to be indicative of the relative size or actual number of bits that constitute each field. The total number of bits in COUNT-C may remain as 32 bits, or may be changed, e.g. increased to a larger number of bits (e.g. 64 bits) or any other number. For the integrity protection algorithm/operation, COUNT-I may be constructed utilizing similar schemes/principles to the above in certain cases.

In this embodiment:
Ciphering location is at the low portion of the RLC, hence it is closer or more amenable to make use of hardware implementations.
Ciphering sequence number (i.e. COUNT-C) may reuse/make use of existing RLC SN and/or identifiers as input(s), hence resulting in reduced overhead.
The receiver can optimize reassembly implementations since the deciphering operation does not separate the two levels of reassembly operations.

Ciphering in RLC: Alternative 3

Figure 9:
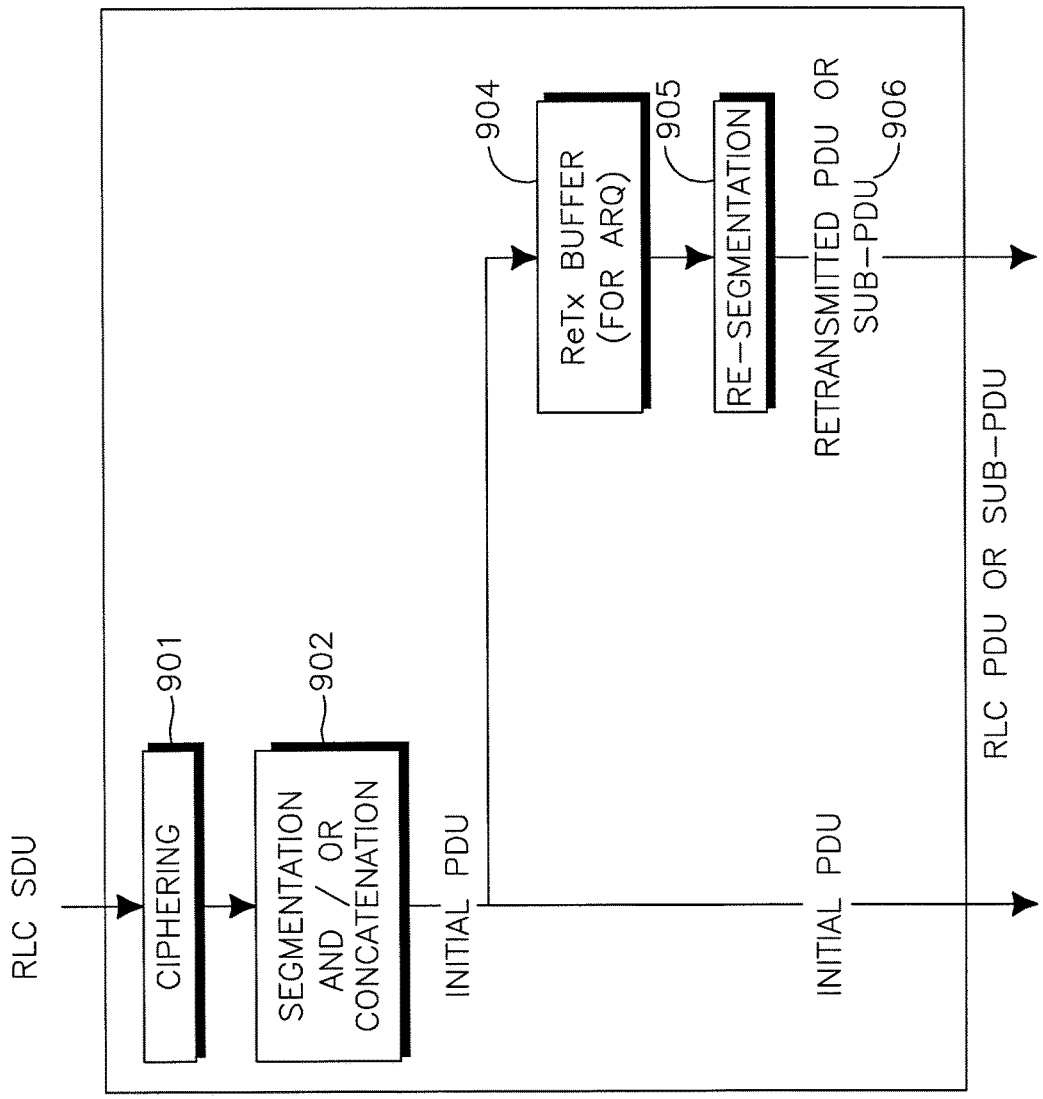
FIG. 9 shows ciphering performed on RLC SDUs according to a third embodiment.

As shown in FIG. 9 in this embodiment, the transmitting node that is performing the ciphering operation (i.e. the UE for uplink traffic, and the eNB for downlink traffic) will perform ciphering on the RLC SDUs received from the PDCP layer above the RLC. There are two variations for doing ciphering in this case:
Ciphering is done on the whole the PDCP PDU (i.e. RLC SDU payload)
Ciphering is done only on the PDCP PDU payload (i.e. the PDCP SDU), and exclude the PDCP header.

According to the architecture, the transmitting node (TXN) (i.e. the UE in case of uplink traffic direction, and the eNB in case of downlink traffic direction) will perform the following procedure:
First, the TXN will cipher the payload of the RLC SDU (in one variant) or will cipher the whole RLC SDU (in another variant) 901
The TXN may perform segmentation and concatenation on one or more of the RLC SDU(s) and create an initial RLC PDU 902
The TXN will store a copy of the initial RLC PDU in the ReTx buffer 903, to support future retransmission if needed
The TXN will transmit the initial RLC PDU
In case ARQ retransmission is required:
The TXN will use the initial RLC PDU stored in the ReTx buffer 904
The TXN may re-segment the stored PDU and create one or more Sub-PDUs 905.
The retransmitted RLC PDUs or Sub-PDUs 906 are not re-ciphered, since ciphering is only done on the RLC SDUs.

Figure 18:
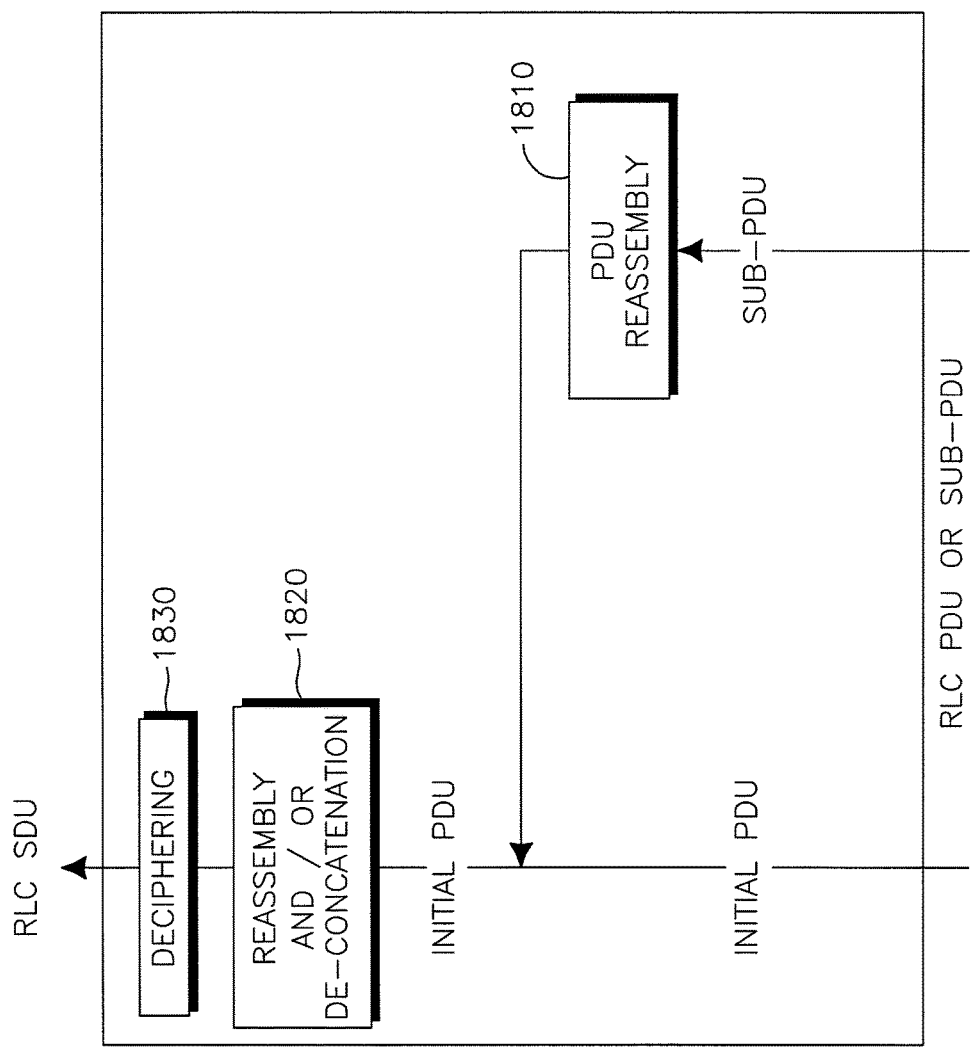
FIG. 18 shows a RXN procedure from the ciphering performed on RLC SDUs.

According to FIG. 18, the receiving node (RXN) (i.e. the UE in case of downlink traffic direction, and the eNB in case of uplink traffic direction) will perform the following procedure:
First, the RXN reassembles an initial RLC PDU from multiple Sub-PDUs, or from a single PDU in case no re-segmentation was done 1810

The RXN reassembles the RLC SDU from multiple PDUs in case segmentation was done, or from a single PDU in case no segmentation was done. The RXN de-concatenates the RLC SDUs from the PDU in case concatenation was done 1820

The RXN deciphers the payload of the RLC SDU (in one variant) or deciphers the whole RLC SDU (in another variant) 1830.

Although it is assumed that PDU re-segmentation is performed in the operations above, the schemes described above can still apply when SDU re-segmentation is employed instead.

In this third embodiment of RLC ciphering Alternative 3, the ciphering sequence number such as COUNT-C preferably makes use of the sequence number(s) or packet identifiers that are provided by the RLC. Depending on how the RLC provides sequence numbering and packet identification, and depending on if the PDCP layer above RLC provides its own sequence numbering, different variants can exist:

Variant 1: PDCP PDU SN

Figure 10A:
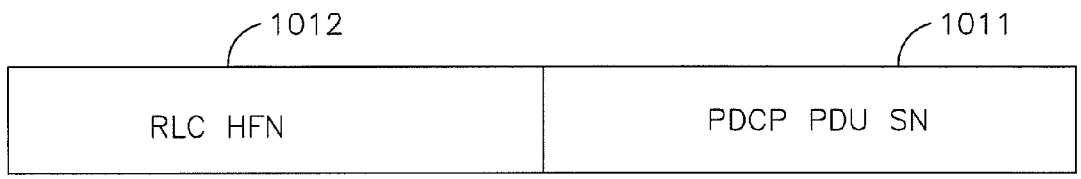
FIGS. 10A-10C show variations of Count-C configurations according to a third embodiment.

In FIG. 10A, if the PDCP layer performs sequence numbering on a PDCP PDU level (i.e. PDCP PDU SN), the COUNT-C will be constructed from the PDCP PDU SN 1011 and a RLC HFN 1012.

The RLC HFN is incremented at each PDCP PDU SN cycle.

Variant 2: RLC SDU SN

Figure 10B:
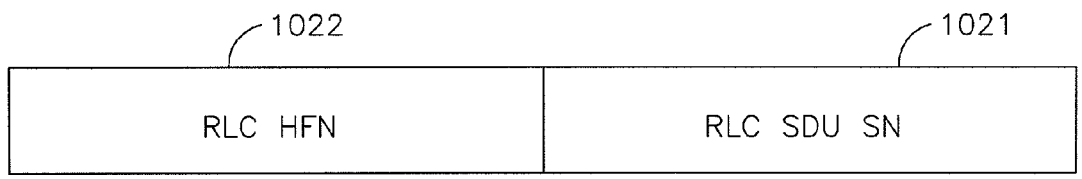

In FIG. 10B, if the RLC performs numbering on an RLC SDU level (i.e. RLC SDU SN), the COUNT-C will be constructed from the RLC SDU SN 1021 and a RLC HFN 1022.

The RLC HFN is incremented at each RLC SDU SN cycle.

Variant 3: New RLC Ciphering SN

Figure 10C:
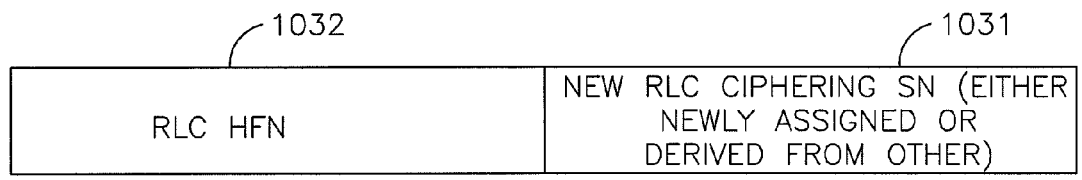

In FIG. 10C, an alternative variation would be to not directly use the RLC numbers utilized for RLC reassembly or reordering operations, but rather create another SN to be dedicated for ciphering purposes, whereby the COUNT-C will be constructed from the new RLC ciphering SN 1031, and a RLC HFN 1032. The new RLC ciphering SN may be a function of existing RLC numbers/identifiers, or may be independently assigned.

The RLC HFN is incremented at each RLC Ciphering SN cycle.

In this embodiment:

Re-ciphering of re-transmitted packets is not required;

Ciphering sequence number (i.e. COUNT-C) may reuse/make use of existing PDCP or RLC SN and/or identifiers as input(s), hence resulting in reduced overhead.

The receiver can optimize reassembly implementations since the deciphering operation does not separate the two levels of reassembly operations.

Ciphering at the MAC Layer

Ciphering for RLC TM traffic is performed in the MAC layer utilizing an 8-bit connection frame number CFN to construct COUNT-C. The CFN is derived from the System Frame Number (SFN). Such reliance on SFN will not be suitable for LTE ciphering purposes however, since LTE systems envision that all traffic types will make use of Hybrid ARQ (HARQ), which can change the order of packet reception.

Below is described how MAC ciphering can be achieved in LTE for any type/mode of traffic (e.g. AM, UM, TM), or for all modes of traffic.

Ciphering in MAC: Alternative 1

Figure 11:
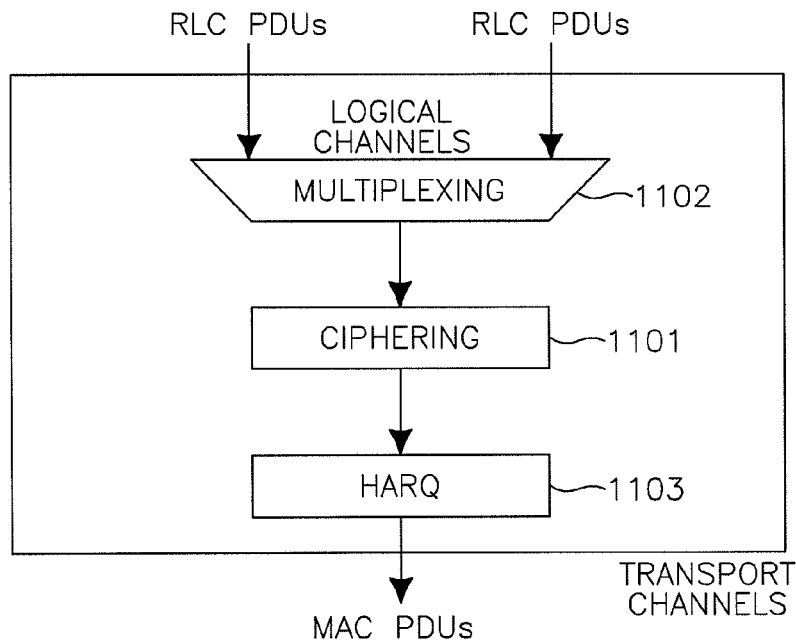
FIG. 11 shows ciphering performed in the MAC layer on MAC SDUs after multiplexing.

In FIG. 11, the transmitting node that is performing the ciphering operation 1101 (i.e. the UE for uplink traffic, and the eNB for downlink traffic) performs ciphering on the MAC "multiplexed packet" 1102 that results from the potential multiplexing of one or more MAC SDUs. There are two variations for ciphering in this case:

Ciphering is done on the whole the MAC "multiplexed packet", which is our preferred embodiment Ciphering is done only on the payload of the MAC "multiplexed packet", and hence the "multiplexing" information/header will not be ciphered.

According, the transmitting node (TXN) (i.e. the UE in case of uplink traffic direction, and the eNB in case of downlink traffic direction) performs the following procedure as shown in FIG. 11:

First, the TXN may perform multiplexing (concatenation) of several MAC SDUs, and create a MAC "multiplexed packet" 1102.

The TXN ciphers 1101 the payload of the MAC "multiplexed packet" (in one variant) or ciphers the whole MAC "multiplexed packet" (in another preferred variant) and sends the resulting packet to a HARQ process 1103.

The TXN HARQ process transmits the packet.

Figure 19:
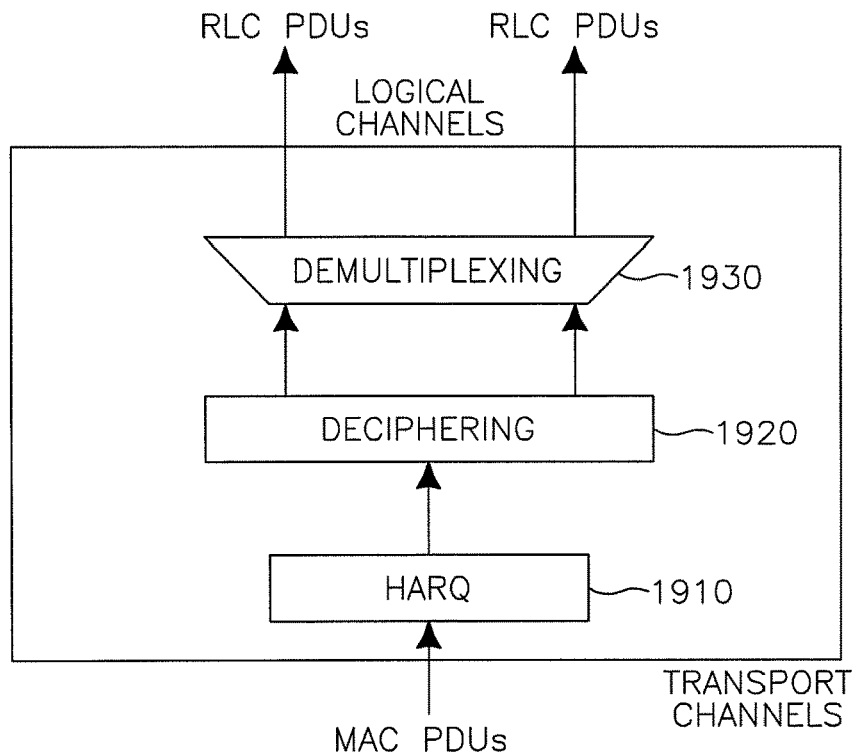
FIG. 19 shows a RXN procedure from the ciphering performed in the MAC layer on MAC SDUs after multiplexing.

In FIG. 19, the receiving node (RXN) (i.e. the WTRU in case of downlink traffic direction, and the eNB in case of uplink traffic direction) performs the following procedure:

The RXN HARQ process will receive the packet 1910

The RXN will decipher the payload of the MAC "multiplexed packet" (in one variant) or will decipher the whole MAC "multiplexed packet" (in another preferred variant) 1920

The RXN will de-multiplex (de-concatenate) the MAC SDUs from the received packet 1930.

In this MAC ciphering alternative, the ciphering sequence number such as COUNT-C is constructed using new MAC sequence numbers that are introduced in the LTE MAC layer to facilitate ciphering operations, since the SFN/CFN method will not work for LTE given that HARQ will be used for all traffic types (except possibly for initial access messages).

The new sequence number could be a MAC Ciphering SN (to be used solely for the purpose of ciphering operations), or could be a MAC Transmission SN (introduced for the purpose of ciphering operations, but possibly utilized for other purposes such as introducing a MAC-level reordering function in LTE). Such new sequence number (MAC Ciphering SN or MAC Transmission SN) may be utilized across all logical channels of the MAC, or alternatively, each logical channel can utilize its own sequence number, or alternatively, a group of logical channel(s) can utilize/share their own sequence number.

In case it is decided that certain traffic types will forgo HARQ retransmissions (e.g. by setting max number of HARQ retransmissions to 0 for example), then an optional provision may be made whereby for such services, the SFN/CFN can be used as input for COUNT-C in this case, instead of the new MAC sequence number.

Alternatively, in other variants for MAC level ciphering, the MAC may utilize some of the sequence numbering and packet identification provided by the RLC.

The following describes the different variants:

Variant 1: MAC Ciphering SN

Figure 12A:
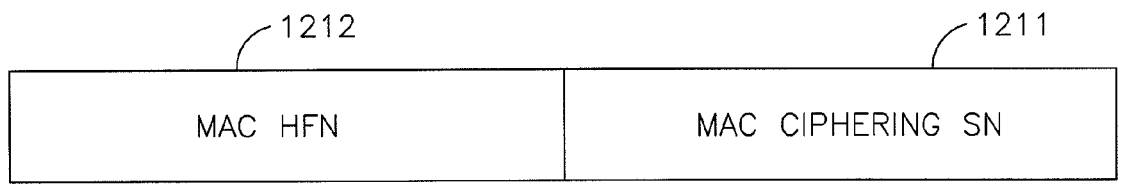
FIGS. 12A-12B show variations of Count-C configurations according to a fourth embodiment.

In FIG. 12A, the MAC provides/assigns an SN to be dedicated for ciphering purposes, whereby the COUNT-C is constructed from such new MAC Ciphering SN 1211, and a MAC HFN 1212. The MAC Ciphering SN may be utilized across all MAC logical channels, or alternatively each one or each group of logical channels may have/utilize its/their own MAC Ciphering SN.

In this alternative, the MAC Ciphering SN is incremented every time a MAC "multiplexed packet" is sent to a HARQ process.

The MAC HFN is incremented at each MAC Ciphering SN cycle.

Variant 2: MAC Transmission SN

Figure 12B:
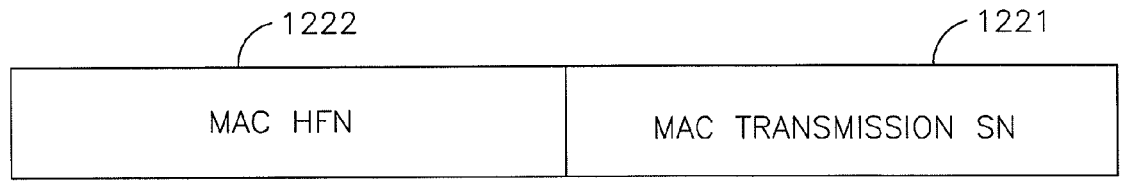

In FIG. 12B, the MAC provides/assigns an SN that is primarily introduced to be utilized for ciphering purposes and possibly utilized for other functions such as enabling MAC level packet re-ordering, whereby the COUNT-C will be constructed from such new MAC Transmission SN 1221, and a MAC HFN 1222. The MAC Transmission SN may be utilized across all MAC logical channels, or alternatively each one or each group of logical channels may have/utilize its/their own MAC Ciphering SN.

In this alternative, the MAC Transmission SN is incremented every time a MAC "multiplexed packet" is sent to a HARQ process.

The MAC HFN is incremented at each MAC Transmission SN cycle.

In this embodiment:
Ciphering location is in the MAC, hence it is closer or more amenable to make use of hardware implementations.
Ciphering in MAC: Alternative 2

Figure 13:
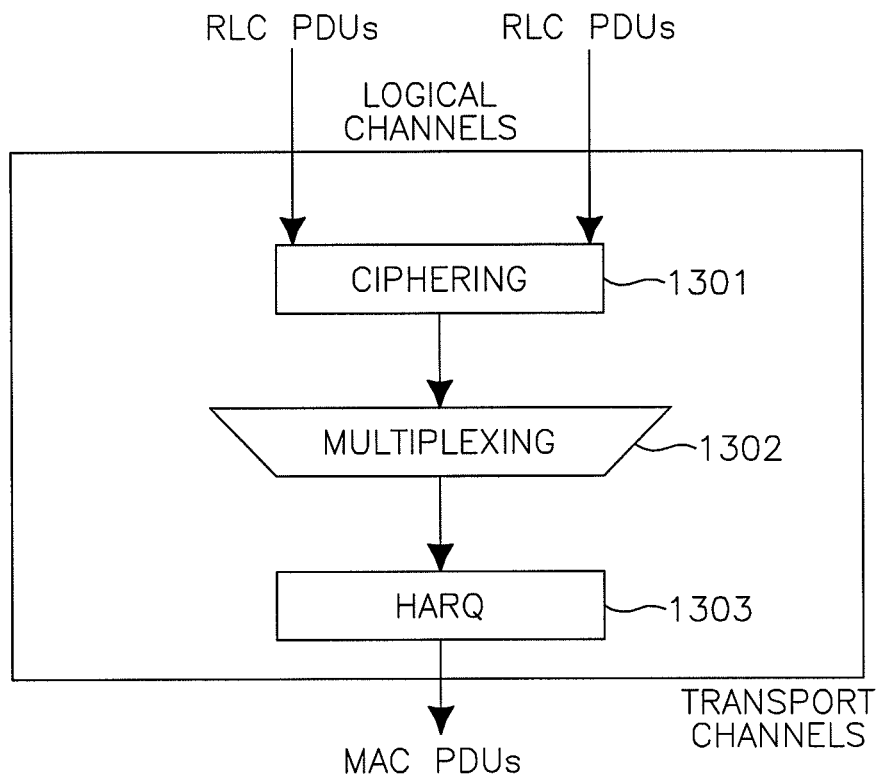
FIG. 13 shows ciphering performed in the MAC layer on MAC SDUs before multiplexing.

In FIG. 13, the transmitting node that is performing the ciphering operation (i.e. the UE for uplink traffic, and the eNB for downlink traffic) performs ciphering on the RLC PDUs received from the RLC layer above the MAC. There are two variations for doing ciphering in this case:
Ciphering is done on the whole RLC PDU (i.e. MAC SDU payload), which is our preferred embodiment.
Ciphering is done only on the RLC PDU payload (i.e. the RLC SDU), and hence the RLC header will not be ciphered According to this architecture, the transmitting node (TXN) (i.e. the UE in case of uplink traffic direction, and the eNB in case of downlink traffic direction) perform the following procedure:
First, the TXN will cipher 1301 the payload of the MAC SDU (in one variant) or will cipher the whole MAC SDU (in another preferred variant).
The TXN may perform multiplexing 1302 (concatenation) of several ciphered MAC SDUs, and send the resulting MAC "multiplexed packet" to a HARQ process.
The TXN HARQ process 1303 will transmit the packet.

Figure 20:
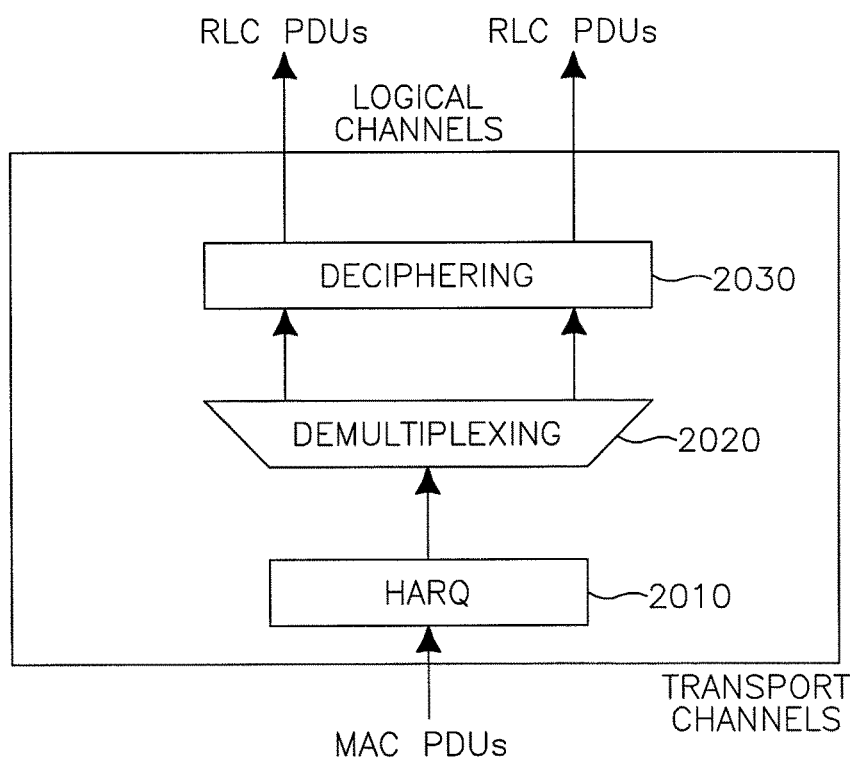
FIG. 20 shows a RXN procedure from the ciphering performed in the MAC layer on MAC SDUs before multiplexing.

In FIG. 20, the receiving node (RXN) (i.e. the UE in case of downlink traffic direction, and the eNB in case of uplink traffic direction) will perform the following procedure:
The RXN HARQ process will receive the packet 2010
The RXN will de-multiplex (de-concatenate) the MAC SDUs from the received MAC "multiplexed packet" 2020
For each MAC SDU, the RXN will decipher the payload of the MAC
SDU (in one variant) or will decipher the whole MAC SDU (in another preferred variant) 2030.
Variant 1: MAC Ciphering SN
Similar to the Variant 1 MAC ciphering embodiment described above, except that in this alternative, the MAC Ciphering SN is incremented every time an RLC PDU is received.

Variant 2: MAC Transmission SN
Similar to the Variant 1 MAC ciphering embodiment described above, except that in this alternative, the MAC Transmission SN is incremented every time an RLC PDU is received.

Variant 3: Reusing RLC Numbering/Identification Information

In such variants, the MAC may reuse the RLC numbering/identification information instead of introducing MAC-level sequence numbers as described above for the RLC ciphering variants.

In this embodiment:
Ciphering location is in the MAC, hence it is closer or more amenable to make use of hardware implementations.
Flexible/Negotiable Sizes of the SN's Used for Ciphering In order to avoid ambiguity due to insufficient SN sizes and SN roll-over problems, the TXN and RXN may negotiate the size of the SN field to be utilized to construct COUNT-C, depending on any traffic characteristics (e.g. data rate, QoS requirements, etc. . . . ), or any other criteria. For example, for certain 'slow' AM traffic flows, the TXN and RXN could negotiate a smaller RLC PDU SN size when compared to a 'fast' AM traffic flow.

Primitive to Dynamically Pass the "Length" Field Each Time a New Packet is Submitted into the Ciphering Engine In UMTS systems, the packet "Length" input was semi-static for an RLC link since the RLC PDUs had a fixed size that was configurable. In LTE systems, with dynamically changing RLC PDU sizes due to adaptive segmentation according to the TB size every TTI, the "Length" indication has to be dynamically passed along with every PDU. Hence, we propose to add a new primitive between the layer that performs the ciphering (e.g. RLC, MAC or PDCP) and the ciphering engine, that will communicate the length of each packet supplied to the ciphering engine. Similarly, on the receiving side, we propose to add a similar primitive for the purpose of the deciphering engine.

Primitive to Pass the SN Information Between PDCP and RLC

In some of the variants proposed in previous sections, we propose that the RLC may reuse the PDCP SN as input into the RLC-located ciphering engine. Hence, we propose to add a new primitive between the PDCP and the RLC layers to separately communicate the PDCP SN for each of the packets the PDCP supplies to the RLC. Similarly, on the receiving side, we propose to add a similar primitive.

Primitive to Pass the SN Information Between RLC and MAC

In some of the variants proposed in previous sections, we propose that the MAC may reuse one or more of the various RLC SN's as input into the MAC-located ciphering engine. Hence, we propose to add a new primitive between the RLC and the MAC layers to separately communicate the RLC SN for each of the packets the RLC supplies to the MAC. Similarly, on the receiving side, we propose to add a similar primitive.

For the above described embodiments, the COUNT-C and its inputs (e.g. HFN, Sequence Numbers, segment length or segment offset, etc. . . . ) are not supposed to be ciphered when they are used as inputs to the COUNT-C, since they will be used/needed as inputs for the deciphering operation. Typically, COUNT-C will have a fixed length, while the HFN component of the COUNT-C will be shrunk (reduced in size) whenever either more inputs or longer inputs are taken in constructing the COUNT-C.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
   an antenna;
   a processor configured to derive a packet data convergence protocol (PDCP) sequence number (SN) in a layer above a radio link control (RLC) layer, the PDCP SN having a length in bits based on a received configuration;
   the processor further configured to derive a COUNT value from the PDCP SN, the COUNT value comprising a hyperframe number (HFN) and the PDCP SN, wherein the COUNT value has a fixed length in bits, and wherein the HFN has a length in bits that varies based on the length in bits of the PDCP SN;
   the processor further configured to cipher data using the derived COUNT value; and
   a transmitter, operatively coupled to the antenna, configured to transmit at least one signal including the ciphered data via a wireless interface.

2. The WTRU of claim 1 wherein the ciphered data is PDCP payload data.

3. The WTRU of claim 1 wherein the ciphered data is ciphered using a length value.

4. The WTRU of claim 1 wherein a radio link control (RLC) layer segments or concatenates PDCP protocol data units (PDUs).

5. The WTRU of claim 4 wherein the RLC layer resegments RLC PDUs.

6. A method for use in a wireless transmit/receive unit (WTRU), the method comprising:
   deriving, by a processor, a packet data convergence protocol (PDCP) sequence number (SN) having a length in bits based on a received configuration;
   deriving, by the processor, a COUNT value from the PDCP SN, the COUNT value comprising a hyperframe number (HFN) and the PDCP SN, wherein the COUNT value has a fixed length in bits, and wherein the HFN has a length in bits that varies based on the length in bits of the PDCP SN;
   ciphering, by the processor, data using the derived COUNT value; and
   transmitting, by a transmitter operatively coupled to an antenna, at least one signal including the ciphered data via a wireless interface.

7. The method of claim 6 wherein the ciphered data is PDCP payload data.

8. The method of claim 6 wherein the ciphered data is ciphered using a length value.

9. The method of claim 6 wherein a radio link control (RLC) layer segments or concatenates PDCP protocol data units (PDUs).

10. The method of claim 9 wherein the RLC layer resegments RLC PDUs.

* * * * *